United States Patent
Suzuki

(10) Patent No.: US 10,412,375 B2
(45) Date of Patent: Sep. 10, 2019

(54) DISPLAY DEVICE, ELECTRONIC APPARATUS, AND METHOD FOR CONTROLLING DISPLAY DEVICE

(71) Applicant: Japan Display Inc., Tokyo (JP)

(72) Inventor: Daichi Suzuki, Tokyo (JP)

(73) Assignee: Japan Display Inc., Tokyo (JP)

(*) Notice: Subject to any disclaimer, the term of this patent is extended or adjusted under 35 U.S.C. 154(b) by 263 days.

(21) Appl. No.: 15/408,963

(22) Filed: Jan. 18, 2017

(65) Prior Publication Data

US 2017/0208320 A1 Jul. 20, 2017

(30) Foreign Application Priority Data

Jan. 20, 2016 (JP) .................. 2016-009217

(51) Int. Cl.
*G09G 5/00* (2006.01)
*H04N 13/31* (2018.01)
(Continued)

(52) U.S. Cl.
CPC ......... *H04N 13/31* (2018.05); *G02B 27/2214* (2013.01); *G02F 1/1347* (2013.01); *G02F 1/1368* (2013.01); *G02F 1/13306* (2013.01); *G02F 1/136286* (2013.01); *G09G 3/003* (2013.01); *G09G 3/3607* (2013.01);
(Continued)

(58) Field of Classification Search
CPC ..... G02B 27/2214; G06F 3/012; G06F 3/013; G09G 3/3266; G09G 3/3674; G09G 3/3677; G09G 3/003; G09G 3/3607; G09G 3/3648; G09G 2300/023; G09G 2300/0452; G09G 2300/0857; G09G 2320/028; H04N 13/31; H04N 13/366–13/383; H04N 13/0409;
(Continued)

(56) References Cited

U.S. PATENT DOCUMENTS

2011/0051239 A1 3/2011 Daiku
2011/0116166 A1* 5/2011 Jung ............... G02B 27/26
359/465
(Continued)

FOREIGN PATENT DOCUMENTS

JP 2005-092103 A 4/2005
JP 2005-164916 A 6/2005
(Continued)

*Primary Examiner* — Amr A Awad
*Assistant Examiner* — Aaron Midkiff
(74) *Attorney, Agent, or Firm* — Michael Best & Friedrich LLP

(57) ABSTRACT

According to an aspect, a display device includes: a display unit that includes a plurality of pixels arranged in a matrix and that is configured to display images corresponding to a plurality of viewpoints; a parallax adjustment that is placed at a position facing the display unit, and in which a plurality of transmissive regions for transmitting light and a plurality of non-transmissive regions for limiting transmittance of light are provided in a switchable manner; a parallax controller that is configured to change positions of the transmissive regions and the non-transmissive regions, based on external information; and a display controller that is configured to change a number of successive pixels displaying an image corresponding to each of the viewpoints, based on external information.

17 Claims, 24 Drawing Sheets

(51) Int. Cl.
*G02B 27/22* (2018.01)
*G02F 1/133* (2006.01)
*G02F 1/1362* (2006.01)
*G02F 1/1368* (2006.01)
*G09G 3/36* (2006.01)
*G09G 3/00* (2006.01)
*H04N 13/376* (2018.01)
*H04N 13/373* (2018.01)
*G02F 1/1347* (2006.01)

(52) U.S. Cl.
CPC ......... H04N 13/373 (2018.05); H04N 13/376 (2018.05); *G02F 2203/01* (2013.01); *G09G 3/3648* (2013.01); *G09G 2300/023* (2013.01); *G09G 2300/0452* (2013.01); *G09G 2300/0857* (2013.01); *G09G 2320/028* (2013.01)

(58) Field of Classification Search
CPC ............... G02F 1/1347; G02F 1/1368; G02F 1/136286; G02F 1/13306; G02F 2203/01
USPC ............................... 345/204–215; 348/42–60
See application file for complete search history.

(56) References Cited

U.S. PATENT DOCUMENTS

| | | | |
|---|---|---|---|
| 2011/0134163 A1* | 6/2011 | Kimura | G09G 3/3241 345/690 |
| 2013/0027439 A1* | 1/2013 | Kim | G09G 3/003 345/690 |
| 2014/0085439 A1 | 3/2014 | Niwano et al. | |
| 2014/0267242 A1* | 9/2014 | Uehara | G02B 27/2214 345/419 |
| 2014/0320614 A1* | 10/2014 | Gaudreau | G02B 27/2214 348/51 |
| 2016/0198149 A1* | 7/2016 | Yuuki | G02B 27/2214 348/56 |

FOREIGN PATENT DOCUMENTS

| | | |
|---|---|---|
| JP | 2011-053277 A | 3/2011 |
| JP | 2013-176953 * | 8/2013 |

* cited by examiner

FIG.19

| DISTANCE L BETWEEN VIEWPOINT AND PARALLAX CONTROLLER | NUMBER OF PIXELS | NUMBER OF ELECTRODES CORRESPOND- ING TO REGION TO BE CONTROLLED | NUMBER OF REGIONS TO BE CONTROLLED, WIDTH OF EACH OF WHICH IS TO BE CHANGED | POSITION OF REGION TO BE CONTROLLED WIDTH OF WHICH IS TO BE CHANGED |
|---|---|---|---|---|
| $0 \leq L < L1a$ | 1 | 4 | 1 | CENTER |
| $L1a \leq L < L1b$ | 1 | 4 | 0 | - |
| $L1b \leq L < L2a$ | 1 | 4 | 1 | CENTER |
| $L2a \leq L < L2b$ | 2 | 6 | 1 | CENTER |
| $L2b \leq L < L2c$ | 2 | 6 | 0 | - |
| $L2c \leq L$ | 2 | 6 | 1 | CENTER |

DISPLAY DEVICE, ELECTRONIC APPARATUS, AND METHOD FOR CONTROLLING DISPLAY DEVICE

CROSS-REFERENCE TO RELATED APPLICATIONS

This application claims priority from Japanese Application No. 2016-009217, filed on Jan. 20, 2016, the contents of which are incorporated by reference herein in its entirety.

BACKGROUND

1. Technical Field

The present invention relates to a display device that displays an image, an electronic apparatus, and a method for controlling the display device.

2. Description of the Related Art

In a display device including a liquid crystal display (LCD), there is a device that allows an observer to view a stereoscopic image with naked eyes. Japanese Patent Application Laid-open Publication No. 2011-53277 (JP-A-2011-53277) discloses a display device with a parallax barrier including a display unit that divides a right eye image and a left eye image and that alternately arranges and displays the divided images, and a barrier that forms a parallax barrier on a front surface side of the display unit. The display device disclosed in JP-A-2011-53277 controls a slit width of the barrier based on a distance between the observer and the display unit, and expands a distance range in a front-to-rear direction of the display image, the distance range allowing a stereoscopic image of a display image to be viewed.

The display device disclosed in JP-A-2011-53277 changes the width of a plurality of slits that configure the barrier according to the distance between the observer and the display unit. However, in the display unit, a display position of a viewpoint image corresponding to each of the viewpoints is not changed according to the distance between the observer and the display unit. Thus, when the distance between the observer and the display unit varies, the light that transmits through the center of the slit shifts from the center of a pixel to an end of the pixel. Consequently, there is a possibility that the light from the adjacently arranged pixel is viewed by the observer.

For the foregoing reasons, there is a need for a display device and an electronic apparatus that can display an optimal image for each viewpoint according to a variation of a viewpoint position in the front-to-rear direction of the display surface of the display device, and a method for controlling the display device.

SUMMARY

According to an aspect, a display device includes: a display unit that includes a plurality of pixels arranged in a matrix and that is configured to display images corresponding to a plurality of viewpoints; a parallax adjustment that is placed at a position facing the display unit, and in which a plurality of transmissive regions for transmitting light and a plurality of non-transmissive regions for limiting transmittance of light are provided in a switchable manner; a parallax controller that is configured to change positions of the transmissive regions and the non-transmissive regions, based on external information; and a display controller that is configured to change a number of pixels displaying an image corresponding to each of the viewpoints, based on external information.

According to another aspect, a method for controlling a display device including: a display unit that includes a plurality of pixels arranged in a matrix and that is configured to display images corresponding to a plurality of viewpoints; and a parallax adjustment that is placed at a position facing the display unit, and in which a plurality of transmissive regions for transmitting light and a plurality of non-transmissive regions for limiting transmittance of light are provided in a switchable manner, the method includes: changing positions of the transmissive regions and the non-transmissive regions; and changing a number of successive pixels displaying an image corresponding to each of the viewpoints, based on external information.

According to another aspect, a display device includes: a display unit that includes a plurality of pixels arranged in a matrix and that is configured to display images corresponding to at least a first viewpoint and a second viewpoint; and a parallax adjustment that is placed at a position facing the display unit, and in which a plurality of transmissive regions for transmitting light and a plurality of non-transmissive regions for limiting transmittance of light are provided in a switchable manner. When a distance between an observer and the display unit is a first distance, at least a part of the transmissive regions and the non-transmissive regions are alternately arranged at a first interval in the parallax adjustment, and the display unit is configured to display an image corresponding to each of the viewpoints with $p$ ($p \geq 1$) successive pixels; and when the distance between the observer and the display unit is a second distance that is shorter than the first distance, at least a part of the transmissive regions and the non-transmissive regions are alternately arranged at a second interval that is larger than the first interval in the parallax adjustment, and the display unit is configured to display an image corresponding to each of the viewpoints with $q$ ($q > p$) successive pixels.

BRIEF DESCRIPTION OF THE DRAWINGS

FIG. 19 is a diagram illustrating an example of table data stored in a memory;

DETAILED DESCRIPTION

Figure 1:
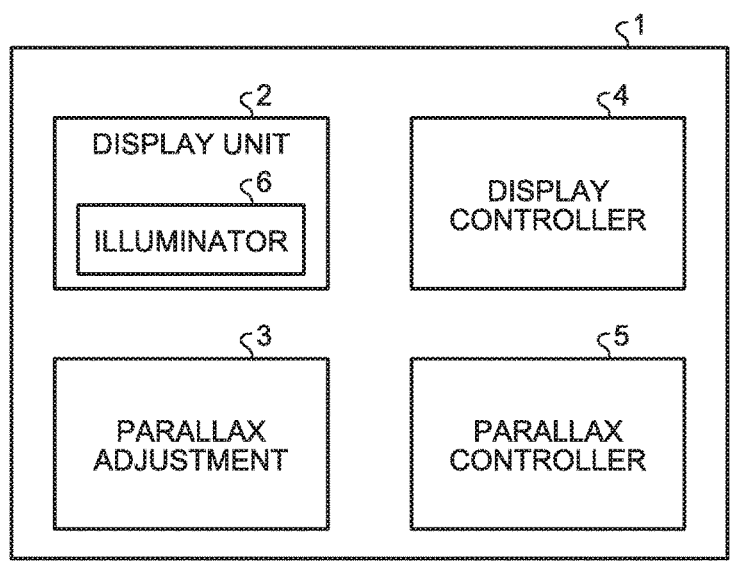
FIG. 1 is a block diagram illustrating an example of a functional configuration of a display device according to an embodiment.

A mode for carrying out the present invention (embodiment) will now be described in detail with reference to the accompanying drawings. The following embodiment is not intended to limit the present invention. The components described below include components that can be easily assumed by a person skilled in the art, and components that are substantially the same as those components. The disclosure is merely an example, and the present invention naturally encompasses appropriate modifications maintaining the gist of the invention that is easily conceivable by those skilled in the art. To further clarify the description, a width, a thickness, a shape, and the like of each component may be schematically illustrated in the drawings as compared with an actual aspect. However, this is merely an example and interpretation of the invention is not limited thereto. The same elements as those described in the drawings that have already been discussed are denoted by the same reference numerals throughout the description and the drawings, and detailed description thereof will not be repeated in some cases.

1. Embodiment

Functional Configuration

FIG. 1 is a block diagram illustrating an example of a functional configuration of a display device according to an embodiment of the present invention. A display device 1 of the present embodiment includes a display unit 2 and a parallax adjustment 3. The display unit 2 is provided with a plurality of pixels configured to display images corresponding to a plurality of viewpoints. The parallax adjustment 3 distributes light associated with each of the viewpoints of the display unit 2, into each viewpoint. The display unit 2 may also include an illuminator 6 that emits light to the pixels. The display device 1 of the present embodiment also includes a display controller 4 and a parallax controller 5. The display controller 4 changes the number of successive pixels displaying an image corresponding to each of the viewpoints, based on external information. The parallax controller 5 changes the positions of a transmissive region and a non-transmissive region of the parallax adjustment 3, based on external information. The number of successive pixels displaying an image corresponding to each of the viewpoints is the number of pixels that display an image corresponding to the same view point, and that are successively arranged in an X axis direction intersecting with a Y axis direction that is an extending direction of a third electrode. The third electrode controls the transmissive region or the non-transmissive region of the parallax adjustment 3. The number of successive pixels is an integer number of one or more, and arrangement of the successive pixels includes a case where a first pixel corresponding to a first viewpoint and a second pixel corresponding to a second viewpoint are alternately arranged, for example.

Structural Overview

Figure 2:
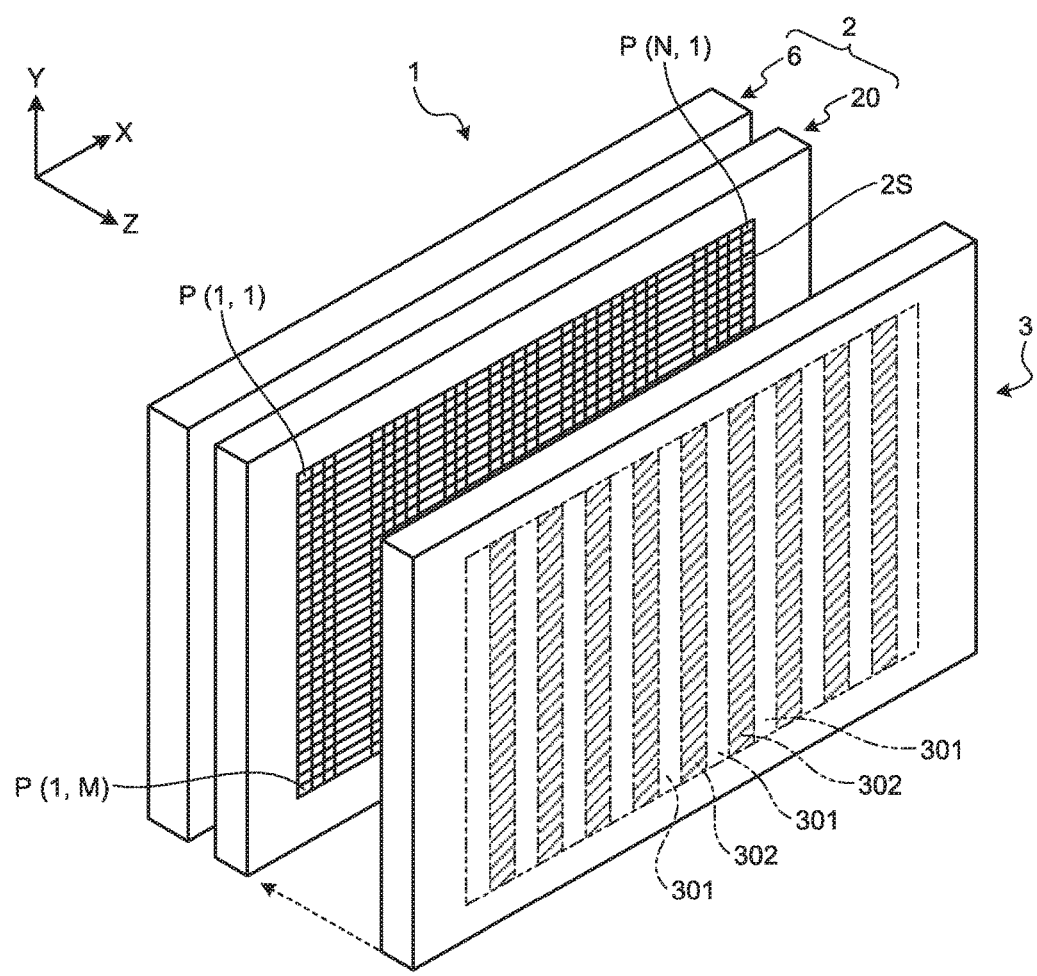
FIG. 2 is an exploded perspective view of the display device according to the embodiment.
Figure 3:
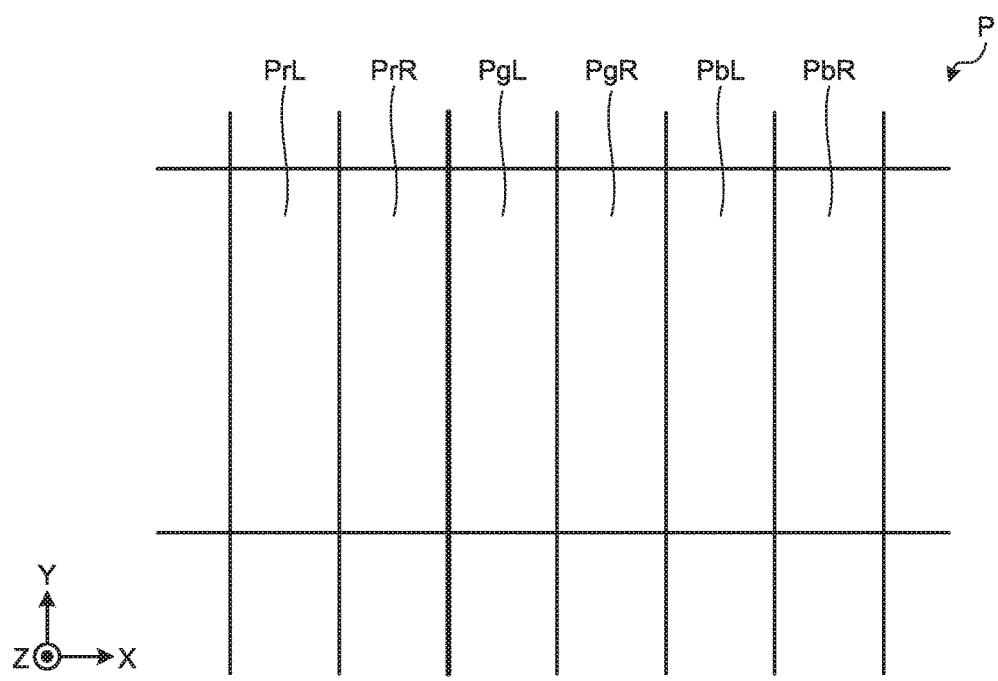
FIG. 3 is a schematic view illustrating an example of a correspondence relationship between color and a viewpoint associated with a pixel of a display unit.

FIG. 2 is an exploded perspective view of the display device according to the embodiment. FIG. 3 is a schematic view illustrating an example of a correspondence relationship between color and a viewpoint associated with a pixel of a display unit. In the following description, an XYZ coordinate system is employed, and the positional relation of various units is described with reference to the XYZ coordinate system. An X axis direction is a direction within a horizontal plane, i.e., a horizontal direction (first direction). A Y axis direction is a direction intersecting with the X axis direction in the horizontal plane, i.e., a vertical direction (second direction). A Z axis direction intersecting with the X axis direction and the Y axis direction, respectively, is a front-to-rear direction (third direction). In other words, the Z axis direction is the direction perpendicular to the horizontal plane on which the X axis direction and the Y axis direction are defined. A plane facing an observer of the display device is referred to as a front surface, and a surface at the side opposite to the front surface is referred to as a rear surface. For example, the front surface of the display unit is a display surface 2S.

As illustrated in FIG. 2, a plurality of pixels P are arranged in a matrix on the display unit 2. For example, the pixels P illustrated in FIG. 2 are two-dimensionally disposed, and N pixels P are disposed in the X direction, and M pixels P are disposed in the Y direction (N and M are natural numbers of one or more). Each of the pixels P is a minimum unit capable of adjusting the light intensity. When the display unit 2 is a transmissive liquid crystal display device, the display unit 2 includes a display panel 20 and the illuminator 6. The illuminator 6 emits light to the display panel 20, and the display panel 20 displays an image on the display surface 2S, by adjusting the transmittance of light that is incident on each of the pixels P. The illuminator 6 is an illumination device that emits planar light toward the display panel 20. The illuminator 6 is arranged so that the light emission surface faces the display panel 20. For example, the illuminator 6 is provided on the rear surface of the display panel 20 as a backlight.

As illustrated in FIG. 2, the parallax adjustment 3 includes a plurality of transmissive regions 301 that transmit light and a plurality of non-transmissive regions 302 that limit light. For example, the transmissive regions 301 and the non-transmissive regions 302 extend in the Y direction, and are alternately disposed in the X direction. The parallax adjustment 3 is arranged on the front surface side of the display unit 2. The parallax adjustment 3 distributes light from the pixel P corresponding to each of the viewpoints, into each viewpoint, by transmitting the light from each of the pixels P of the display unit 2 through the transmissive regions 301, and limiting the light from each of the pixels P by the non-transmissive regions 302.

As illustrated in FIG. 3, each of the pixels P included in the display unit 2 is associated with one of the viewpoints. For example, a pixel associated with a first viewpoint (left eye) is a pixel PL, and a pixel associated with a second viewpoint (right eye) is a pixel PR. Each of the pixels P included in the display unit 2 is associated with one of two or more colors. For example, a pixel Pr is a pixel associated with red being a first color, a pixel Pg is a pixel associated with green being a second color, and a pixel Pb is a pixel associated with blue being a third color. Furthermore, a pixel PrL is a pixel associated with red and the left eye viewpoint, a pixel PrR is a pixel associated with red and the right eye viewpoint, a pixel PgL is a pixel associated with green and the left eye viewpoint, a pixel PgR is a pixel associated with green and the right eye viewpoint, a pixel PbL is a pixel associated with blue and the left eye viewpoint, and a pixel PbR is a pixel associated with blue and the right eye viewpoint.

Operation in Comparative Example

Figure 4:
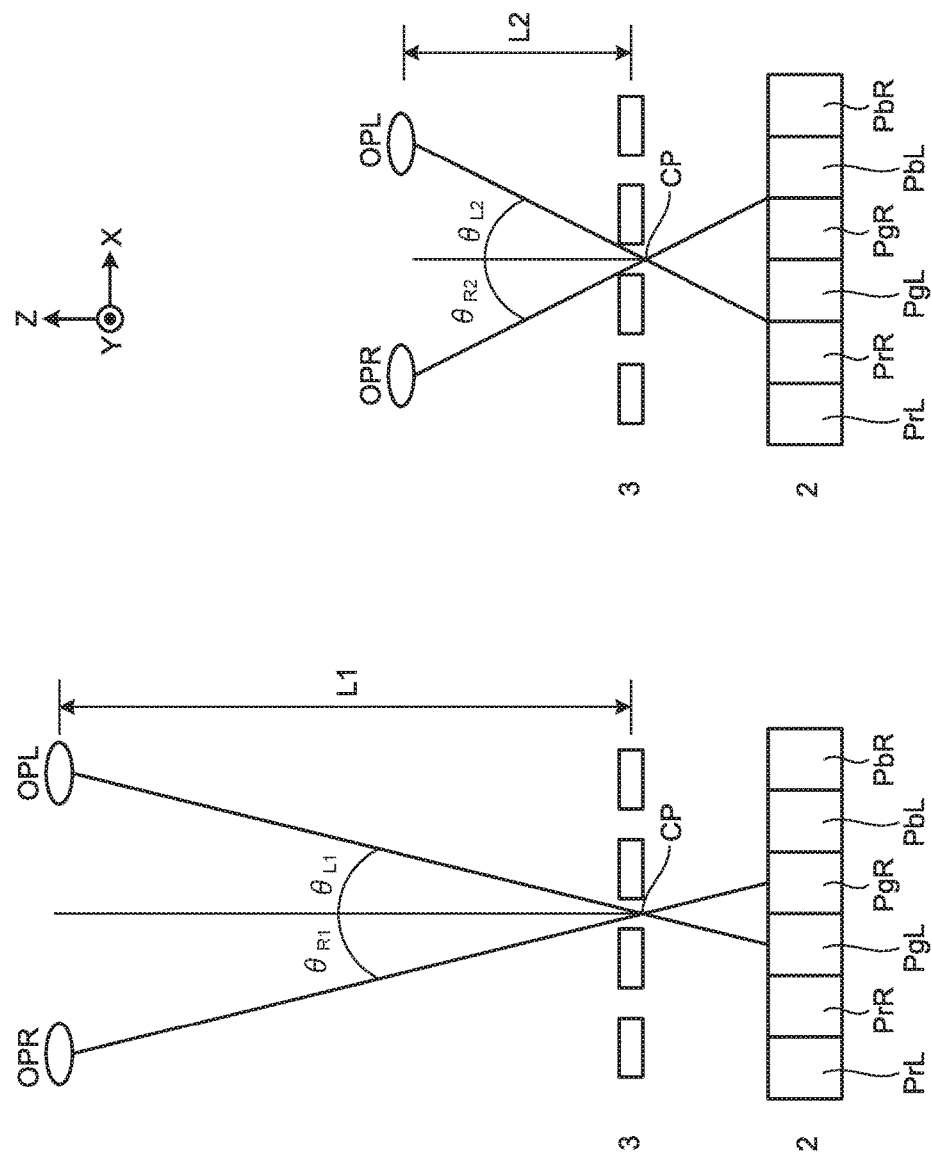
FIG. 4 is an explanatory diagram for illustrating an operation performed by a display controller in a comparative example.
Figure 5:
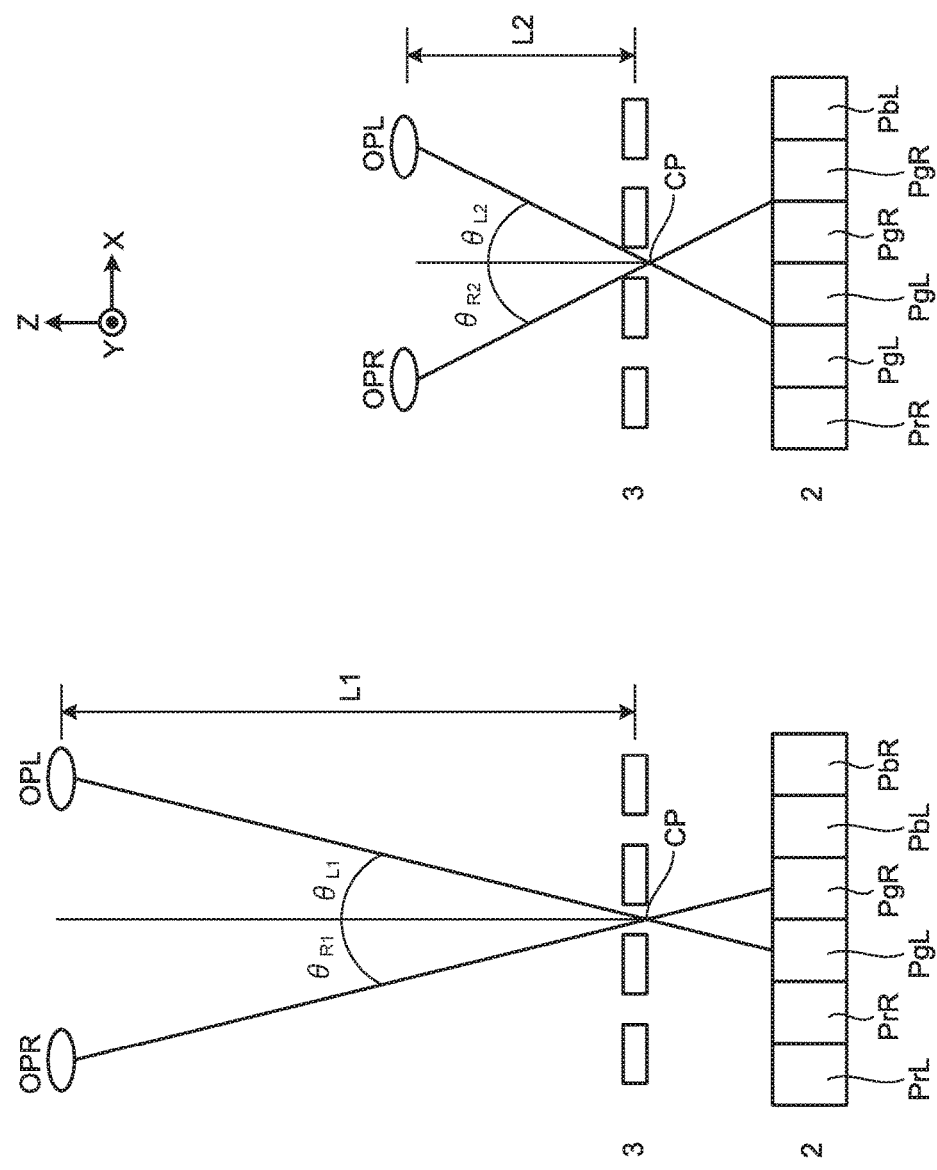
FIG. 5 is an explanatory diagram for illustrating an operation performed by the display controller according to the present embodiment.

FIG. 4 is an explanatory diagram for illustrating an operation performed by a display controller in a comparative example. FIG. 5 is an explanatory diagram for illustrating an operation performed by the display controller according to the present embodiment. The function of the display controller 4 in the display device 1 of the present embodiment will be described in comparison with the comparative example. The comparative example is different from the display controller 4 of the present embodiment in not changing the number of successive pixels displaying the image corresponding to each of the viewpoints, based on external information. The external information includes positional information relating to the viewpoint. The positional information relating to the viewpoint is information indicating the positional relation of the viewpoint relative to the display device, and is indicated by coordinate information, distance information, angle information, and the like. The coordinate information is coordinate information of a viewpoint relative to a center CP of one of the transmissive regions 301, for example. The distance information is about a distance L between the display surface 2S or the front surface of the parallax adjustment 3 and the viewpoint in the Z axis direction, for example. The angle information is about an angle θ formed by a line perpendicular to the front surface of the parallax adjustment 3 and a line segment connecting the center CP of the transmissive region 301 with the viewpoint, for example. The positional information relating to the viewpoint is not limited to the information based on the positions of the right eye and the left eye of the observer, and may also be information based on the position of the head or the position of the body of the observer.

As illustrated in FIG. 4, in the comparative example, when the positional information relating to the viewpoint indicates the first value, the light that transmits through each of the viewpoints and the center CP of the transmissive region 301 of the parallax adjustment 3 transmits through the center position of the pixel P. For example, when a distance between a viewpoint OPL corresponding to the left eye (first viewpoint) and the front surface of the parallax adjustment 3 in the Z axis direction is L1, the line segment connecting the viewpoint OPL with the center CP of the transmissive region 301 transmits through the center position of the pixel PgL. When a distance between a viewpoint OPR corresponding to the right eye (second viewpoint) and the front surface of the parallax adjustment 3 in the Z axis direction is L1, the line segment connecting the viewpoint OPR with the center CP of the transmissive region 301 transmits through the center position of the pixel PgR. In other words, for example, when an angle formed by the line segment connecting the viewpoint OPL with the center CP, and the line perpendicular to the front surface of the parallax adjustment 3, is an angle $\theta_{L1}$, the line segment connecting the viewpoint OPL with the center CP of the transmissive region 301 transmits through the center position of the pixel PgL. When an angle formed by the line segment connecting the viewpoint OPR with the center CP, and the line perpendicular to the front surface of the parallax adjustment 3, is an angle $\theta_{R1}$, the line segment connecting the viewpoint OPR with the center CP of the transmissive region 301 transmits through the center position of the pixel PgR.

When the positional information relating to the viewpoint indicates the first value, the light that passes through the center of the transmissive region 301 having the highest luminance relative to each of the viewpoints passes through the center of the pixel. Thus, this allows the observer to view an image with reduced crosstalk, which occurs due to leakage of light from a pixel associated with a different viewpoint.

Next, in the comparative example, when the viewpoint moves in the Z axis direction so as to approach the display surface 2S, and the positional information relating to the viewpoint indicates the second value, the light that transmits through each of the viewpoints and the center CP of the transmissive region 301 of the parallax adjustment 3 transmits through a boundary position with the adjacently arranged pixel associated with a different viewpoint. For example, when the distance between the viewpoint OPL corresponding to the left eye (first viewpoint) and the front surface of the parallax adjustment 3 in the Z axis direction is L2, the line segment connecting the viewpoint OPL with the center CP of the transmissive region 301 transmits through the boundary position between the pixel PgL and the pixel PrR. For example, when the distance between the viewpoint OPR corresponding to the right eye (second viewpoint) and the front surface of the parallax adjustment 3 in the Z axis direction is L2, the line segment connecting the viewpoint OPR with the center CP of the transmissive region 301 transmits through the boundary position between the pixel PgR and the pixel PbL. In other words, for example, when an angle formed by the line segment connecting the viewpoint OPL with the center CP, and a normal line on the front surface of the parallax adjustment 3, is an angle $\theta_{L2}$, the line segment connecting the viewpoint OPL with the center CP of the transmissive region 301 transmits through the boundary position between the pixel PgL and the pixel PrR. When an angle formed by the line segment connecting the viewpoint OPR with the center CP, and the normal line on the front surface of the parallax adjustment 3, is an angle $\theta_{R2}$, the line segment connecting the viewpoint OPR with the center CP of the transmissive region 301 transmits through the boundary position between the pixel PgR and the pixel PbL.

In the comparative example, the display controller does not change the number of successive pixels displaying an image corresponding to each of the viewpoints, based on the positional information relating to the viewpoint. Thus, when the positional information relating to the viewpoint indicates the second value, the light that passes through the center of the transmissive region 301 having the highest luminance relative to each of the viewpoints passes through the boundary position with the adjacently arranged pixel associated with a different viewpoint. Consequently, the adjacently arranged pixel associated with a different viewpoint is viewed from each of the viewpoints. For example, the pixel PrR that is the pixel for the right eye is viewed at the viewpoint OPL corresponding to the left eye, and the pixel PbL that is the pixel for the left eye is viewed at the viewpoint OPR corresponding to the right eye. Hence, crosstalk occurs due to the light leakage from the pixels of the different viewpoints.

Operation of the Embodiment

As illustrated in FIG. 5, in the present embodiment, when the positional information relating to the viewpoint indicates the first value, similar to the comparative example, the light that transmits through each of the viewpoints and the center CP of the transmissive region 301 of the parallax adjustment 3 transmits through the center position of the pixel. When the positional information relating to the viewpoint indicates the first value, the light that passes through the center of the transmissive region 301 having the highest luminance relative to each of the viewpoints passes through the center of the pixel corresponding to each of the viewpoints. Thus, this allows the observer to view an image with reduced crosstalk, which occurs due to leakage of light from the pixel associated with a different view point.

In the present embodiment, when the viewpoint moves in the Z axis direction so as to approach the display surface 2S, and the positional information relating to the viewpoint indicates the second value, the display controller 4 changes the number of successive pixels displaying an image corresponding to each of the viewpoints. For example, the display controller 4 changes the number of pixels that are successively arranged in a direction (X axis direction) in which the transmissive regions 301 and the non-transmissive regions 302 are alternately arranged in the parallax adjustment 3, and that displays an image corresponding to the same viewpoint, to two. In other words, the display controller 4 changes the number of successive pixels that are successively arranged in a direction opposite to the viewpoint, relative to the center of the transmissive region 301 through which the light from each of the pixels P transmits, to two. That is, two pixels PgL corresponding to the left eye (first viewpoint) and two pixels PgR corresponding to the right eye (second viewpoint) are successively arranged, respectively. Thus, when the positional information relating to the viewpoint indicates the second value, the light that transmits through each of the viewpoints and the center CP of the transmissive region 301 of the parallax adjustment 3 transmits through the boundary position with the adjacently arranged pixel corresponding to the same viewpoint. For example, when the distance between the viewpoint OPL corresponding to the left eye (first viewpoint) and the front surface of the parallax adjustment 3 in the Z axis direction is L2, the line segment connecting the viewpoint OPL with the center CP of the transmissive region 301 transmits through the boundary position between the pixels PgL. When the distance between the viewpoint OPR corresponding to the right eye (second viewpoint) and the front surface of the parallax adjustment 3 in the Z axis direction is L2, the line segment connecting the viewpoint OPR with the center CP of the transmissive region 301 transmits through the boundary position between the pixels PgR. In other words, for example, when an angle formed by the line segment connecting the viewpoint OPL with the center CP, and the normal line on the front surface of the parallax adjustment 3, is the angle $\theta_{L2}$, the line segment connecting the viewpoint OPL with the center CP of the transmissive region 301 transmits through the boundary position between the pixels PgL. When an angle formed by the line segment connecting the viewpoint OPR with the center CP, and the normal line on the front surface of the parallax adjustment 3, is the angle $\theta_{R2}$, the line segment connecting the viewpoint OPR with the center CP of the transmissive region 301 transmits through the boundary position between the pixels PgR.

When the positional information relating to the viewpoint indicates the second value, the light that passes through the transmissive region 301 having the highest luminance relative to each of the viewpoints, transmits through the boundary position with the adjacently arranged pixel corresponding to the same viewpoint. Thus, the pixels viewed from each of the viewpoints are the pixels associated with each of the viewpoints. For example, the pixels viewed from the viewpoint OPL corresponding to the left eye (first viewpoint) are the pixels PgL that are both the pixels for the left eye. The pixels viewed from the viewpoint OPR corresponding to the right eye (second viewpoint) are the pixels PgR that are both the pixels for the right eye. Consequently, it is possible to suppress the crosstalk that occurs when a pixel corresponding to a different viewpoint is viewed.

Structural Details: Display Unit

Figure 6:
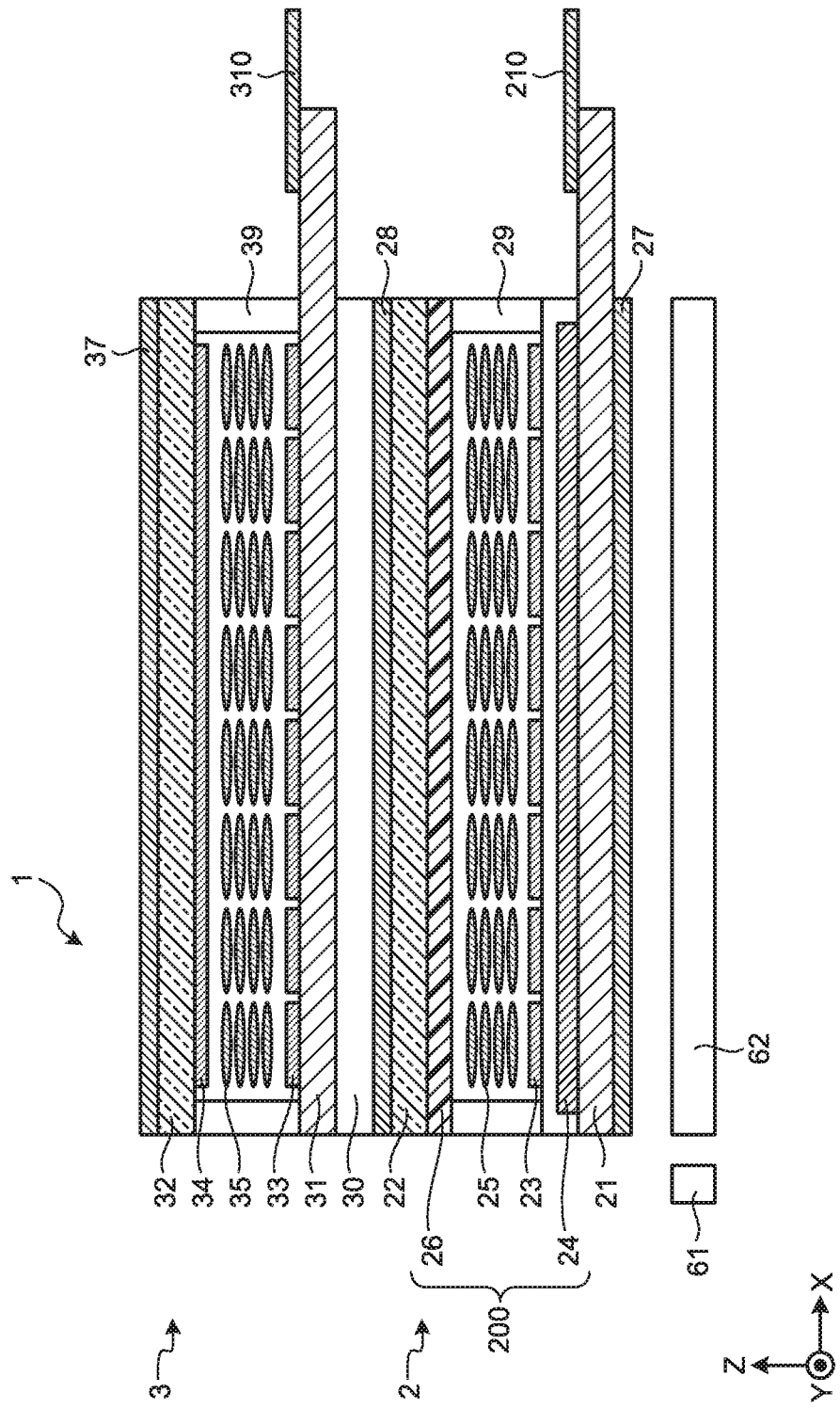
FIG. 6 is a sectional view illustrating a schematic sectional structure of the display device including the display unit and a parallax adjustment.

Next, a configuration example of the display unit 2 and the parallax adjustment 3 will be described. FIG. 6 is a sectional view illustrating a schematic sectional structure of the display device 1 including the display unit 2 and the parallax adjustment 3.

As illustrated in FIG. 6, in the display device 1, the parallax adjustment 3 is layered on the display unit 2. In the present embodiment, the display unit 2 and the parallax adjustment 3 in the display device 1 are bonded to each other by an adhesive layer 30. The display unit 2 includes a first substrate 21, a second substrate 22, and a display function layer 200. The second substrate 22 is arranged facing the front surface of the first substrate 21 in the vertical direction. The display function layer 200 is inserted between the first substrate 21 and the second substrate 22, and adjusts the light intensity for each pixel. The first substrate 21 and the second substrate 22 are glass substrates or film substrates. The first substrate 21 and the second substrate 22 are bonded to each other by a sealing member 29.

The display function layer 200 includes a plurality of first electrodes 23, a second electrode 24, and an insulating layer. The first electrodes 23 are arranged for respective pixels on the front surface of the first substrate 21 in a matrix. The second electrodes 24 are formed so as to face at least one of the first electrodes 23. The insulating layer insulates the first electrode 23 from the second electrode 24. For example, the second electrodes 24, the insulating layer, and the first electrodes 23 are layered on the first substrate 21 in the above order. In the present embodiment, the second electrode 24 is a plate-shaped electrode common to the first electrodes 23.

The display function layer 200 includes a color filter 26 formed on the rear surface of the second substrate 22. In the color filter 26, color filters colored in three colors of red (R), green (G), and blue (B) are periodically arrayed so as to correspond to respective colors associated with the pixels P. For example, in the Y axis direction, the pixels P that are disposed in the same column are disposed so as to be associated with the same color. In the X axis direction, the pixels P are arrayed so as to be associated with different colors in a cycle of a predetermined number of pixel rows. The color filter 26 may also be formed on the first substrate 21.

The display function layer 200 includes a liquid crystal layer 25 that modulates light that passes therethrough, according to the state of an electric field, serving as a display element. In the present embodiment, for example, the liquid crystal layer 25 employs a liquid crystal in a horizontal electric field mode such as an in-plane switching (IPS). However, the liquid crystal layer 25 may also employ a liquid crystal in a vertical electric field mode. For example, the liquid crystal layer 25 may employ a liquid crystal of various modes such as a twisted nematic (TN) mode, a vertical alignment (VA) mode, and an electrically controlled birefringence (ECB) mode. An orientation film that defines the initial orientation direction of each liquid crystal may be arranged between the liquid crystal layer 25 and the first substrate 21, as well as between the liquid crystal layer 25 and the second substrate 22.

A first polarizing plate 27 is arranged on the rear surface of the first substrate 21, and a second polarizing plate 28 is arranged on the front surface of the second substrate 22. For example, the first polarizing plate 27 and the second polarizing plate 28 are in a crossed-Nicols relationship with each other. The front surface of the second polarizing plate 28 is bonded to the parallax adjustment 3 via the adhesive layer 30. For example, the adhesive layer 30 employs a transparent adhesive agent, and may employ a super view resin or the like. The second polarizing plate 28 is arranged on the front surface of the second substrate 22. However, it is not limited thereto, and the second polarizing plate 28 may be formed on the rear surface of a third substrate 31, and the rear surface of the second polarizing plate 28 may be bonded to the display unit 2 via the adhesive layer 30.

The illuminator 6 is arranged at the position facing the rear surface of the first substrate 21. The illuminator 6 includes a light source 61 and a light guide plate 62. The light source 61 is arranged at the side surface of the light guide plate 62, and the light guide plate 62 is arranged so as to face the display panel 20. The light from the light source 61 enters the light guide plate 62, and the light is emitted to the display panel 20 via the light guide plate 62. For example, the light source 61 employs a light-emitting diode (LED) and the like. In the present embodiment, the illuminator 6 is a side light type in which the light source 61 is arranged on the side surface of the light guide plate 62. However, it is not limited thereto, and the illuminator 6 may also be a direct light type in which a plurality of light sources 61 are provided at the position facing the display panel 20. An optical sheet may be provided between the light guide plate 62 and the display panel 20. For example, the optical sheet may be a luminance-enhancing sheet such as a prism sheet. Furthermore, an optical sheet such as an antireflection film may be arranged on the rear surface of the light guide plate 62.

Structural Details: Parallax Adjustment

The parallax adjustment 3 includes the third substrate 31, a plurality of third electrodes 33, a fourth substrate 32, a fourth electrode 34, and a third polarizing plate 37. The third electrodes 33 are disposed on the front surface of the third substrate 31 so as to extend in the Y axis direction and be arranged in the X axis direction. The fourth electrode 34 having a plate shape is arranged on the rear surface of the fourth substrate 32 so as to face the third electrodes 33. The third polarizing plate 37 is arranged on the front surface of the fourth substrate 32. For example, the second polarizing plate 28 and the third polarizing plate 37 are in a crossed-Nicols relationship with each other. The third substrate 31 and the fourth substrate 32 are glass substrates or film substrates. The third substrate 31 and the fourth substrate 32 are bonded to each other by a sealing member 39.

A liquid crystal layer 35 is filled between the third substrate 31 and the fourth substrate 32. The liquid crystal layer 35 modulates light that passes therethrough according to the state of an electric field generated by voltage applied to the third electrodes 33 and the fourth electrode 34. In the present embodiment, for example, the liquid crystal layer 35 may employ a liquid crystal in a vertical electric field mode such as the TN, the VA, and the ECB modes. However, it is not limited thereto, and for example, the liquid crystal layer 35 may employ a liquid crystal in a horizontal electric field mode such as the IPS mode. An orientation film that defines the initial orientation direction of each liquid crystal may be arranged between the liquid crystal layer 35 and the third substrate 31, as well as between the liquid crystal layer 35 and the fourth substrate 32.

Structural Details: Display Controller

Figure 7:
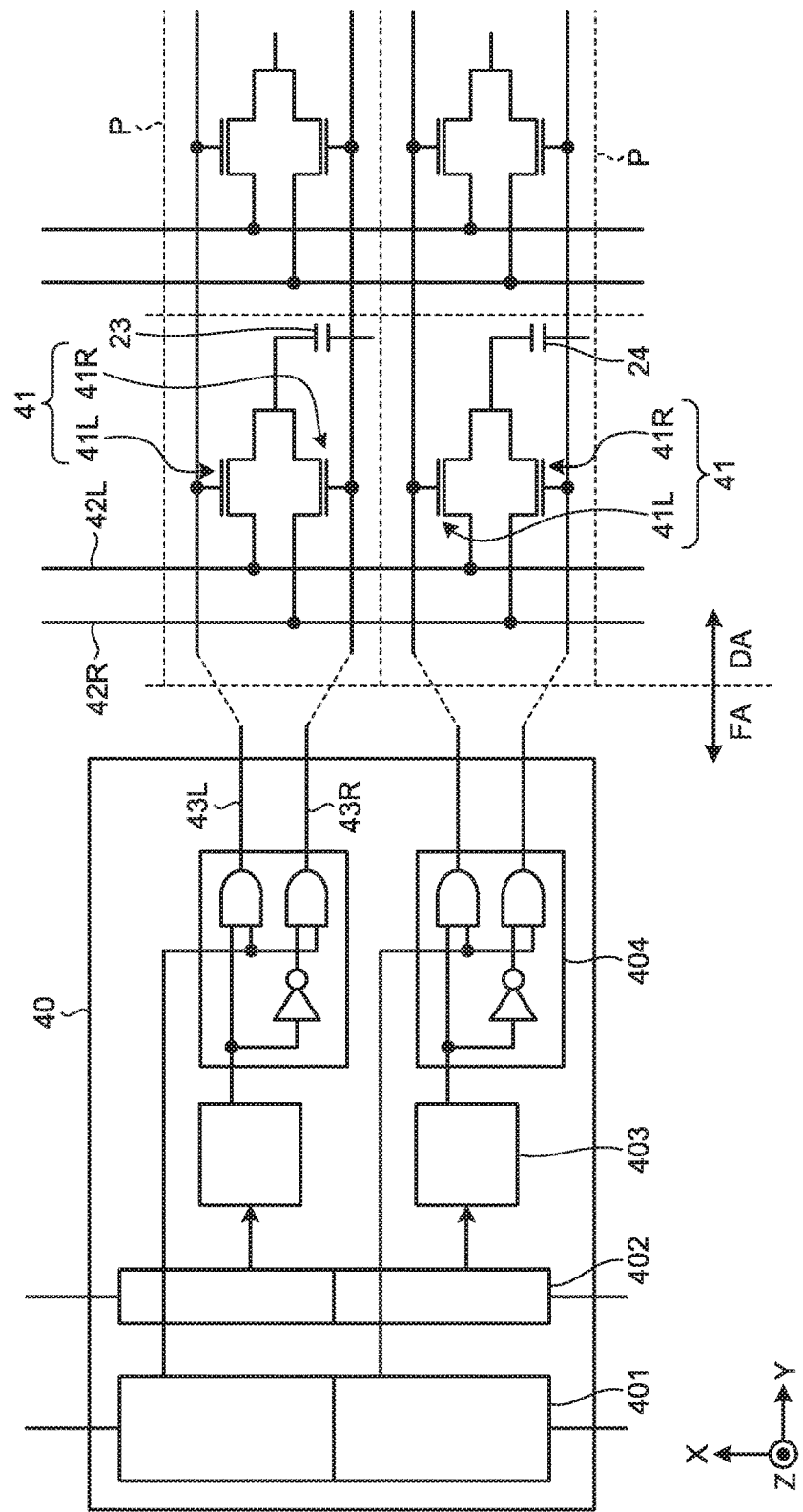
FIG. 7 is a schematic view of a circuit that constitutes the display controller according to the embodiment.

FIG. 7 is a schematic view of a circuit that constitutes the display controller 4 according to the embodiment. In the present embodiment, the display controller 4 includes a plurality of switching elements 41 and a selection circuit 40. The switching elements 41 are provided to respective pixels P and correspond to respective viewpoints. The selection circuit 40 selectively drives one of the switching elements 41 corresponding to each of the viewpoints. The selection circuit 40 is formed on a non-display region FA that is arranged outside of a display region DA on which the pixels P are arranged. For example, the switching element 41 includes two switching elements, a switching element 41L corresponding to the left eye (first viewpoint) and a switching element 41R corresponding to the right eye (second viewpoint).

For example, the switching element 41L and the switching element 41R are thin film transistors (TFTs). One of the source and the drain of the switching element 41L is coupled to a signal line 42L that supplies an image signal corresponding to the left eye (first viewpoint). The gate of the switching element 41L is coupled to a gate line 43L that supplies a gate voltage to the switching element 41L. One of the source and the drain of the switching element 41R is coupled to a signal line 42R that supplies an image signal corresponding to the right eye (second viewpoint). The gate of the switching element 41R is coupled to a gate line 43R that supplies a gate voltage to the switching element 41R. For example, the signal line 42L and the signal line 42R are both arranged in the X axis direction, and the gate line 43R and the gate line 43L are arranged in the Y axis direction. The signal lines 42 and the gate lines 43 need not necessarily be straight lines, and may include a bending part. The other of the source and the drain of the switching element 41R and the other of the source and the drain of the switching element 41L are each coupled to the first electrode 23 of the display unit 2. An electric field is generated in the liquid crystal layer 25 that is disposed between the first electrode 23 and the second electrode 24, according to an electric charge that is supplied from one of the signal line 42L and the signal line 42R to the first electrode 23, and an electric charge that is supplied to the second electrode 24 arranged facing the first electrode 23. Consequently, the transmittance of light coming from each of the pixels P is adjusted, thereby displaying an image.

The selection circuit 40 is coupled to the gate line 43L and the gate line 43R. By selecting one of the gate lines and supplying a gate voltage thereto, one of the switching element 41L and the switching element 41R is turned ON. Consequently, a signal of one of the signal line 42L and the signal line 42R is applied to the liquid crystal layer 25 via the first electrode 23. In other words, the display controller 4 changes the number of successive pixels displaying an image corresponding to each of the viewpoints, by switching the switching element 41 corresponding to each of the viewpoints included in the pixel.

For example, the selection circuit 40 includes a gate drive circuit 401, a selection signal input circuit 402, a selection signal holding circuit 403, and a switching circuit 404. The gate drive circuit 401 supplies a gate drive signal. The selection signal input circuit 402 inputs a selection signal for selecting an image corresponding to one of the viewpoints to be displayed on each of the pixels. The selection signal holding circuit 403 holds the selection signal that is input from the selection signal input circuit 402. The switching circuit 404 supplies a signal to one of the gate line 43L and the gate line 43R, based on the selection signal being held and the gate drive signal supplied from the gate drive circuit 401.

For example, the gate drive circuit 401 is a shift register, and is coupled to the switching circuit 404. The gate drive circuit 401 sequentially supplies gate drive signals (H voltage) to the switching circuit 404. For example, the selection signal input circuit 402 is a shift register, and is coupled to the selection signal holding circuit 403. The selection signal input circuit 402 supplies a selection signal to the selection signal holding circuit 403, for selecting an image corresponding to one of the viewpoints to be displayed by a pixel row corresponding to the selection signal holding circuit 403. For example, the selection signal holding circuit 403 is a latch circuit and is coupled to the selection signal input circuit 402 and the switching circuit 404. The selection signal holding circuit 403 holds the selection signal from the selection signal input circuit. For example, the switching circuit 404 is a circuit including two AND circuits and an inverter. The gate drive circuit 401 and the selection signal holding circuit 403 are coupled to an input terminal of one of the AND circuits, and the gate line 43L is coupled to an output terminal thereof. The gate drive circuit 401 and the selection signal holding circuit 403 are coupled to an input terminal of the other AND circuit via the inverter, and the gate line 43R is coupled to an output terminal thereof. The inverter may also be arranged between the AND circuit that is coupled to the gate line 43L and the selection signal holding circuit 403 that is coupled to the input terminal of the AND circuit. The circuits that constitute the selection circuit 40 are examples, and are not limited thereto. Each of the circuits may have a different configuration as long as the circuit has the same function.

Operation of Display Controller

Figure 8:
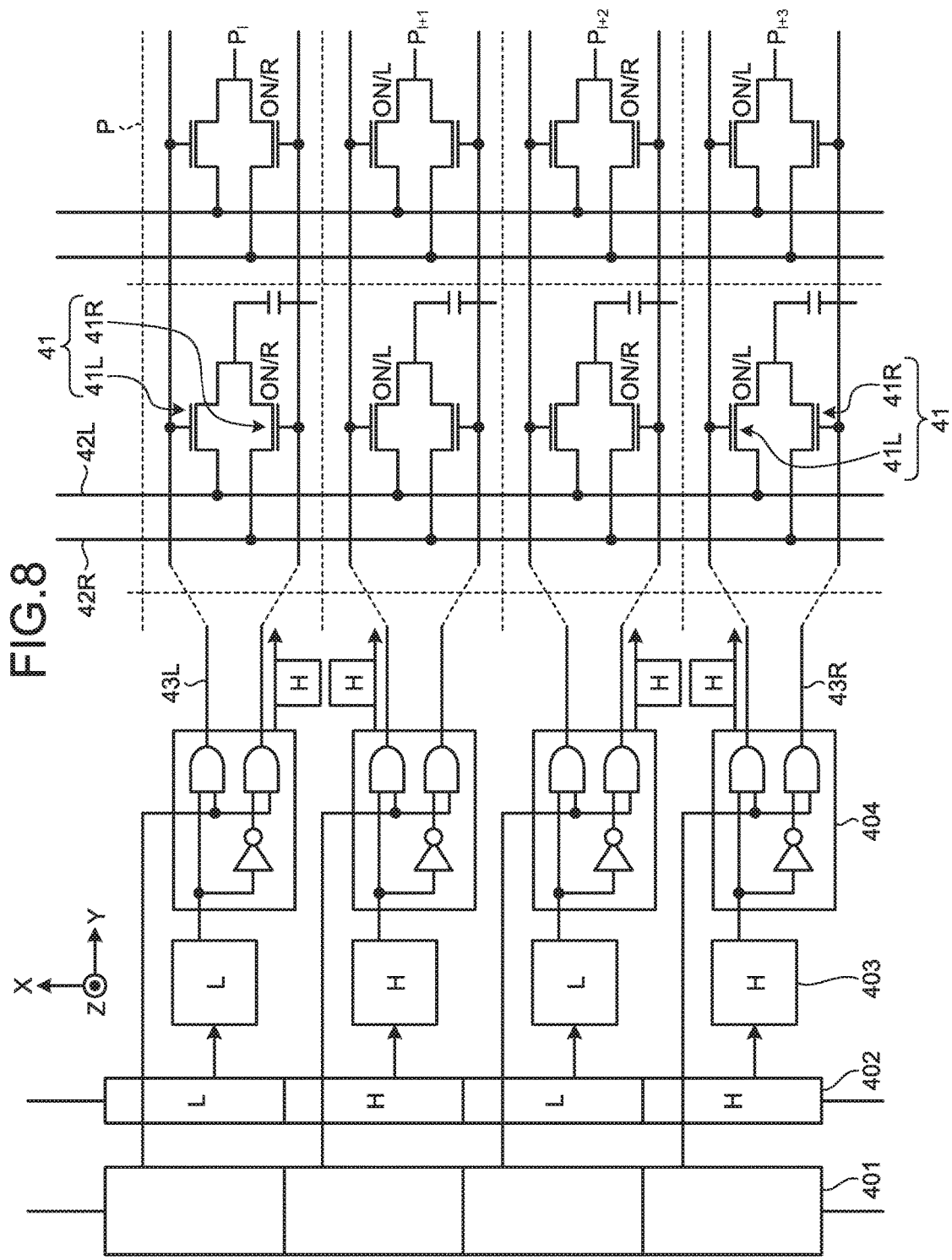
FIG. 8 is an explanatory diagram for illustrating an operation performed by the display controller, when the number of successive pixels displaying an image corresponding to each viewpoint is one.
Figure 9:
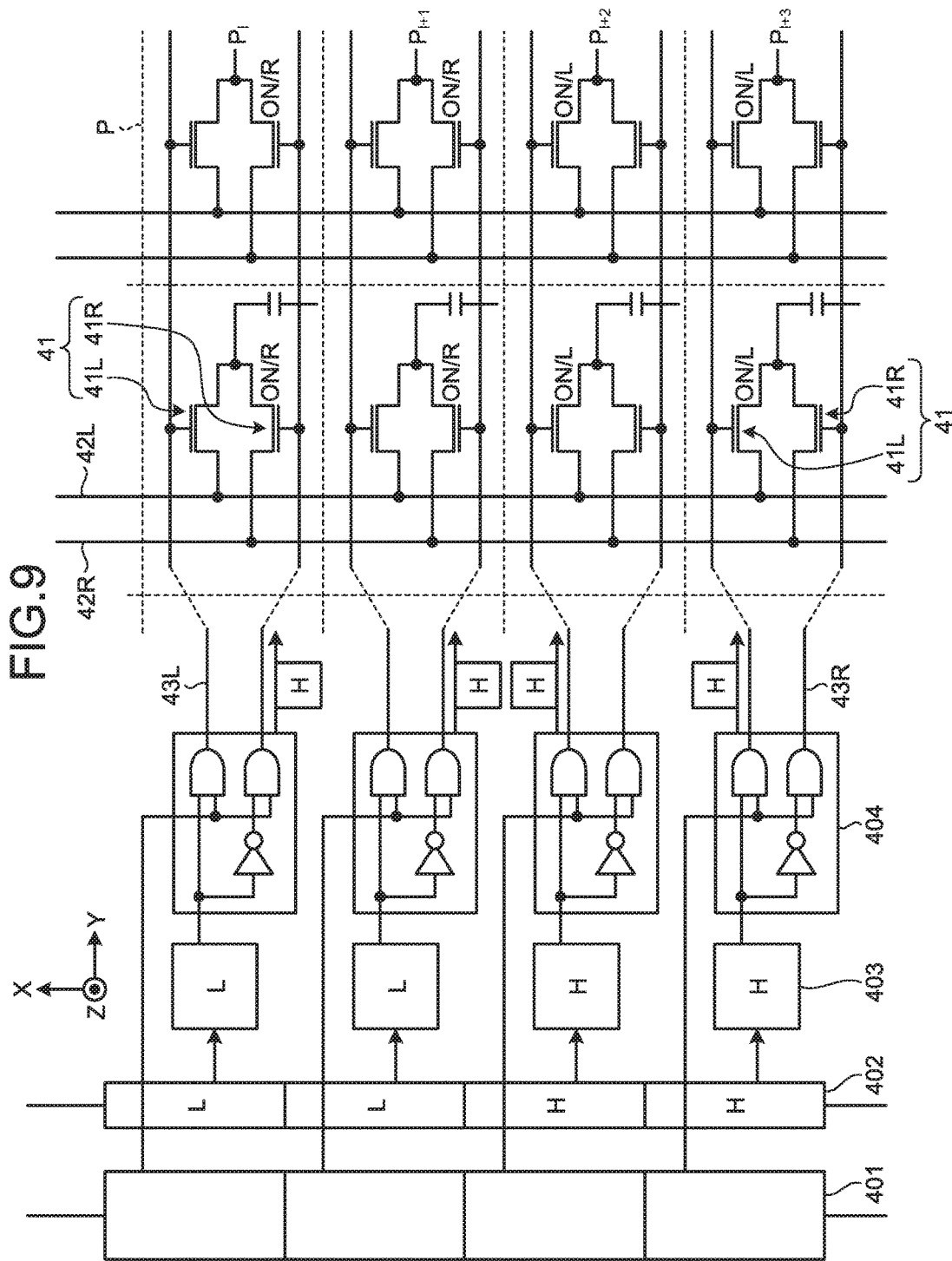
FIG. 9 is an explanatory diagram for illustrating an operation performed by the display controller, when the number of successive pixels displaying the image corresponding to each viewpoint is two.

FIG. 8 is an explanatory diagram for illustrating an operation performed by the display controller, when the number of successive pixels displaying an image corresponding to each viewpoint is one. FIG. 9 is an explanatory diagram for illustrating an operation performed by the display controller, when the number of successive pixels displaying an image corresponding to each viewpoint is two. An operation performed by the display controller 4 will be described below with reference to FIG. 8 and FIG. 9. Among the pixel rows that are controlled by the gate line coupled to the same selection circuit 40, a pixel row $P_l$ to a pixel row $P_{l+3}$ are described as an example. For example, l is a natural number of one or more.

When the positional information relating to the viewpoint indicates the first value, the selection signal in which the number of successive pixels displaying an image corresponding to each of the viewpoints is one, is input to the selection signal input circuit 402. For example, the selection signal is supplied so as to supply an L potential to the pixel row $P_l$ and the pixel row $P_{l+2}$, and to supply an H potential to the pixel row $P_{l+1}$ and the pixel row $P_{l+3}$, via the shift register. The potentials are held in the respective selection signal holding circuits 403.

Next, a signal is applied to the gate drive circuit 401, and a drive signal (H potential) is sequentially supplied to each of the switching circuits 404 via the shift register. For example, in the first timing, the H potential is supplied from the gate drive circuit 401 to the switching circuit 404 corresponding to the pixel row $P_l$. Meanwhile, the L potential is held in the selection signal holding circuit 403 that is coupled to the switching circuit 404 corresponding to the pixel row $P_l$. Thus, a gate voltage is supplied to the gate line 43R. Consequently, the switching element 41R is brought into a conductive state, and a pixel signal corresponding to the right eye (second viewpoint) is supplied to the first electrode 23 via the signal line 42R. Next, in the second timing, the H potential is supplied from the gate drive circuit 401 to the switching circuit 404 corresponding to the pixel row $P_{l+1}$. Meanwhile, the H potential is held in the selection signal holding circuit 403 that is coupled to the switching circuit 404 corresponding to the pixel row $P_{l+1}$. Thus, a gate voltage is supplied to the gate line 43L. Consequently, the switching element 41L is brought into a conductive state, and a pixel signal corresponding to the left eye (first viewpoint) is supplied to the first electrode 23 via the signal line 42L. In the third timing, the H potential is supplied from the gate drive circuit 401 to the switching circuit 404 corresponding to the pixel row $P_{l+2}$. Meanwhile, the L potential is held in the selection signal holding circuit 403 that is coupled to the switching circuit 404 corresponding to the pixel row $P_{l+2}$. Thus, a gate voltage is supplied to the gate line 43R. Consequently, the switching element 41R is brought into a conductive state, and a pixel signal corresponding to the right eye (second viewpoint) is supplied to the first electrode 23 via the signal line 42R. In the fourth timing, the H potential is supplied from the gate drive circuit 401 to the switching circuit 404 corresponding to the pixel row $P_{l+3}$. Meanwhile, the H potential is held in the selection signal holding circuit 403 coupled to the switching circuit 404 corresponding to the pixel row $P_{l+3}$. Thus, a gate voltage is supplied to the gate line 43L. Consequently, the switching element 41L is brought into a conductive state, and a pixel signal corresponding to the left eye (first viewpoint) is supplied to the first electrode 23 via the signal line 42L.

By operating in this manner, the display controller 4 can supply the pixel signal corresponding to a different viewpoint for each pixel row. In other words, the display controller 4 can set the number of pixels to one. The number of pixels is the number of successive pixels that are successively arranged in the X axis direction intersecting with the Y axis direction, i.e., the extending direction of the third electrodes 33 controlling the transmissive region 301 and the non-transmissive region 302, and that correspond to the same viewpoint.

Next, when the positional information relating to the viewpoint indicates the second value, the selection signal indicating the number of successive pixels displaying an image corresponding to each of the viewpoints is two, is input to the selection signal input circuit 402. For example, the selection signal is supplied so as to supply the L potential to the pixel row $P_l$ and the pixel row $P_{l+1}$, and to supply the H potential to the pixel row $P_{l+2}$ and the pixel row $P_{l+3}$, via the shift register. The potentials are held in the respective selection signal holding circuits 403.

Next, the signal is applied to the gate drive circuit 401, and a drive signal (H potential) is sequentially supplied to each of the switching circuits 404 via the shift register. For example, in the first timing, the H potential is supplied from the gate drive circuit 401 to the switching circuit 404 corresponding to the pixel row $P_l$. Meanwhile, the L potential is held in the selection signal holding circuit 403 that is coupled to the switching circuit 404 corresponding to the pixel row $P_l$. Thus, a gate voltage is supplied to the gate line 43R. Consequently, the switching element 41R is brought into a conductive state, and a pixel signal corresponding to the right eye (second viewpoint) is supplied to the first electrode 23 via the signal line 42R. Next, in the second timing, the H potential is supplied from the gate drive circuit 401 to the switching circuit 404 corresponding to the pixel row $P_{l+1}$. Meanwhile, the L potential is held in the selection signal holding circuit 403 that is coupled to the switching circuit 404 corresponding to the pixel row $P_{l+1}$. Thus, a gate voltage is supplied to the gate line 43R. Consequently, the switching element 41R is brought into a conductive state, and a pixel signal corresponding to the right eye (second viewpoint) is supplied to the first electrode 23 via the signal line 42R. In the third timing, the H potential is supplied from the gate drive circuit 401 to the switching circuit 404 corresponding to the pixel row $P_{l+2}$. Meanwhile, the H potential is held in the selection signal holding circuit 403 that is coupled to the switching circuit 404 corresponding to the pixel row $P_{l+2}$. Thus, a gate voltage is supplied to the gate line 43L. Consequently, the switching element 41L is brought into a conductive state, and a pixel signal corresponding to the left eye (first viewpoint) is supplied to the first electrode 23 via the signal line 42L. In the fourth timing, the H potential is supplied from the gate drive circuit 401 to the switching circuit 404 corresponding to the pixel row $P_{l+3}$. Meanwhile, the H potential is held in the selection signal holding circuit 403 that is coupled to the switching circuit 404 corresponding to the pixel row $P_{l+3}$. Thus, a gate voltage is supplied to the gate line 43L. Consequently, the switching element 41L is brought into a conductive state, and a pixel signal corresponding to the left eye (first viewpoint) is supplied to the first electrode 23 via the signal line 42L.

By operating in this manner, the display controller 4 can supply a pixel signal corresponding to the same viewpoint to the adjacent two pixels. In other words, the display controller 4 can set the number of successive pixels to two. The number of pixels is the number of pixels that are successively arranged in the X axis direction intersecting with the Y axis direction, i.e., the extending direction of the third electrode 33 controlling the transmissive region 301 and the non-transmissive region 302. Thus, when the distance between the parallax adjustment 3 and the viewpoint is a second distance shorter than a first distance, the display controller 4 can increase the number of successive pixels displaying an image corresponding to each of the viewpoints at the second distance, from the number of successive pixels displaying an image corresponding to each of the viewpoints at the first distance.

In the present embodiment, the same signal may be supplied to the successive pixels. For example, the pixel signal corresponding to each of the viewpoints that is to be supplied to the pixel rows $P_l$ and $P_{l+1}$, or the pixel rows $P_{l+2}$ and $P_{l+3}$ may be the same signal. Thus, the gate drive circuit 401 may simultaneously supply the drive signals to the gate lines corresponding to the same viewpoint, instead of sequentially supplying the drive signals to each row in a time division manner. For example, when a pixel included in the pixel row $P_l$ and a pixel included in the pixel row $P_{l+1}$ that is adjacent to the pixel included in the pixel row $P_l$ display the same image, the gate signals may be simultaneously supplied to the switching element 41L included in the pixel row $P_l$ and the switching element 41L included in the pixel row $P_{l+1}$. In the present circuit, the display controller 4 may change the number of successive pixels corresponding to the same viewpoint to three or more, by causing the selection signal holding circuit 403 corresponding to three or more adjacent pixel rows, to hold the same potential.

Structural Details: Parallax Controller

Figure 10:
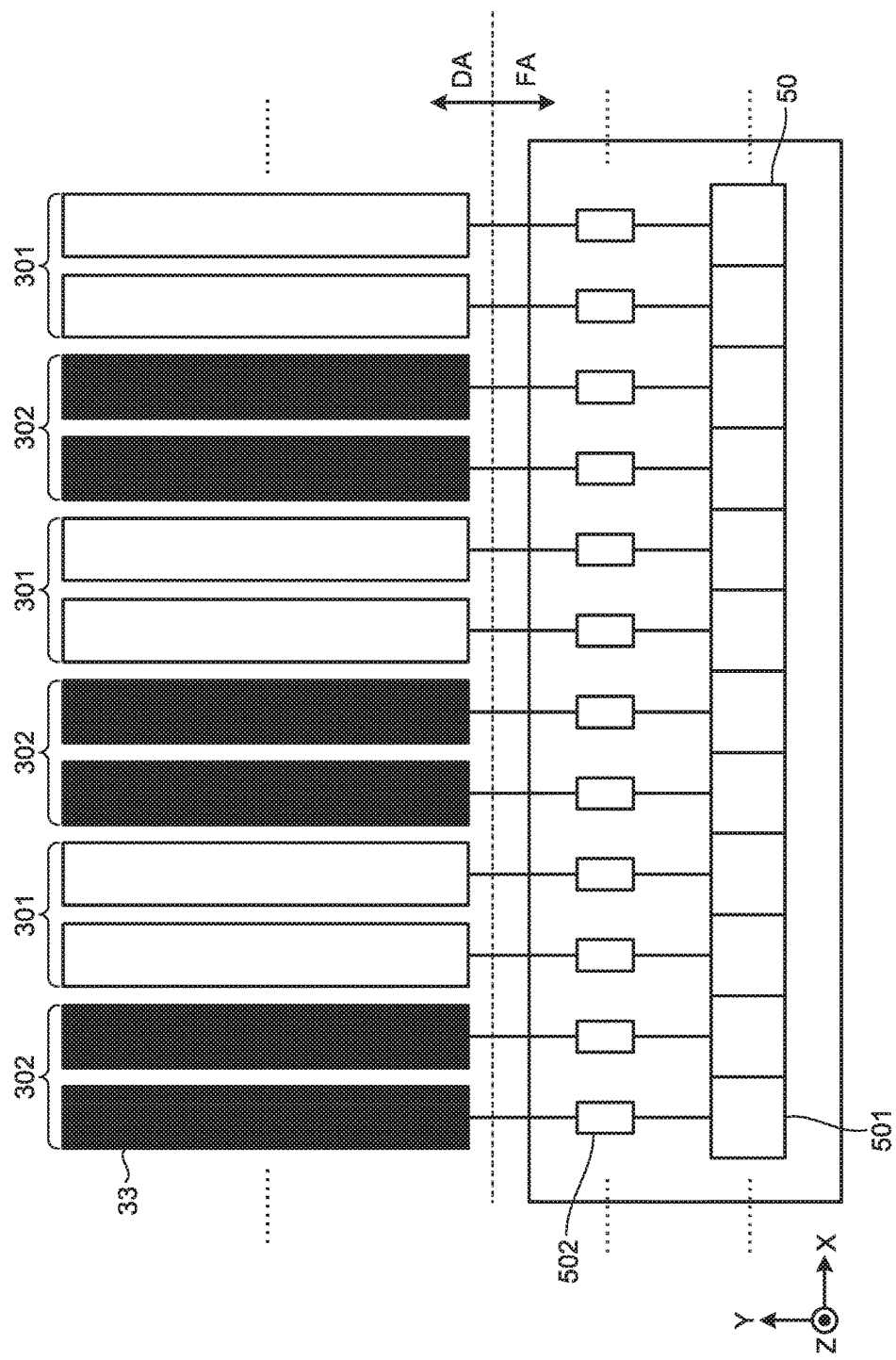
FIG. 10 is an explanatory diagram for illustrating an operation performed by a parallax controller, when positional information relating to the viewpoint indicates a first value.
Figure 11:
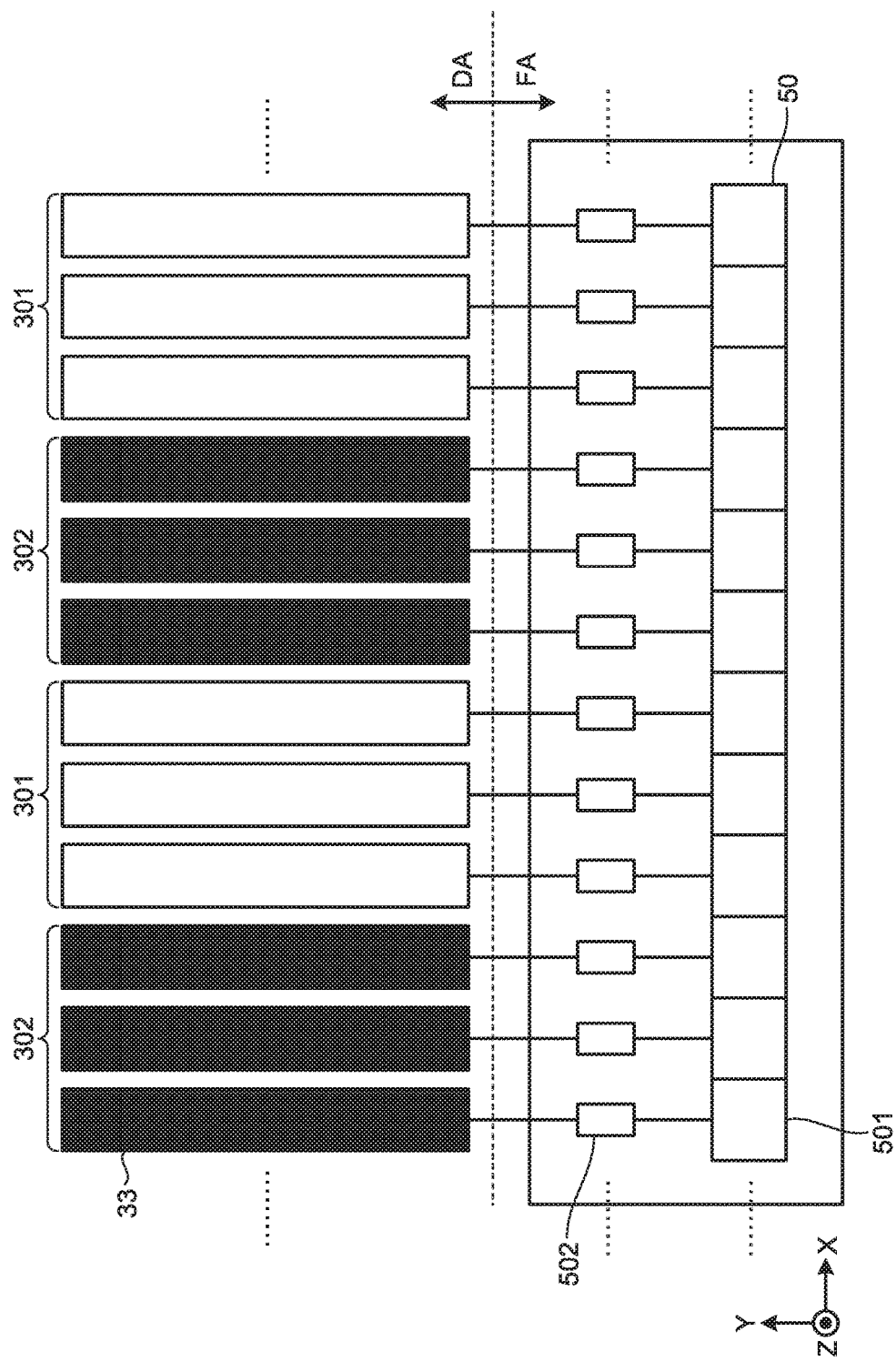
FIG. 11 is an explanatory diagram for illustrating an operation performed by the parallax controller, when positional information relating to the viewpoint indicates a second value.

FIG. 10 is an explanatory diagram for illustrating an operation performed by a parallax controller, when the positional information relating to the viewpoint indicates the first value. FIG. 11 is an explanatory diagram for illustrating an operation performed by the parallax controller, when the positional information relating to the viewpoint is the second value. Based on FIG. 10 and FIG. 11, an example of a structure and an operation of the parallax controller 5 in the display device 1 of the present embodiment will be described.

The parallax controller 5 includes a selection circuit 50 that selectively supplies an electric charge corresponding to the transmissive region 301 or the non-transmissive region 302, to the third electrodes 33. The third electrodes are included in the parallax adjustment 3, extend in the Y axis direction, and are arranged in the X axis direction. The selection circuit 50 is arranged at the position corresponding to the non-display region FA outside of the display region DA on which the pixels of the display unit 2 are arranged. For example, the selection circuit 50 includes a drive signal supply circuit 501 that supplies a drive signal to the third electrode 33. For example, the drive signal supply circuit 501 consists of a shift register. The selection circuit 50 includes a drive signal holding circuit 502 that sequentially stores therein signals being supplied from the drive signal supply circuits 501 and that supplies the signals to the third electrodes 33 at the same timing. For example, the drive signal holding circuit 502 is a latch circuit. The drive signal holding circuit 502 may also include a plurality of latch circuits and a buffer for temporarily storing the drive signals.

When the positional information relating to the viewpoint indicates the first value, the number of successive pixels displaying an image corresponding to each of the viewpoints is one. Thus, the parallax controller 5 controls the transmissive region 301 so that the light from one pixel corresponding to each of the viewpoints can be viewed from the transmissive region 301. For example, the parallax controller 5 applies an electric charge to a region corresponding to two third electrodes 33, to make the region to be the transmissive region 301.

When the positional information relating to the viewpoint indicates the second value, the number of successive pixels displaying an image corresponding to each of the viewpoints is two. Thus, the parallax controller 5 controls the transmissive region 301 so that the light from the two pixels corresponding to each of the viewpoints can be viewed from the transmissive region 301. For example, the parallax controller 5 applies an electric charge to a region corresponding to three third electrodes 33, to make the region to be the transmissive region 301.

The parallax controller 5 having the selection circuit 50 can change the width of the transmissive region 301 and that of the non-transmissive region 302. Thus, when the distance between the parallax adjustment 3 and the viewpoint is the second distance that is shorter than the first distance, the parallax controller 5 can increase the width of the transmissive region 301 through which the light corresponding to each of the viewpoints transmits at the second distance, from the width of the transmissive region 301 through which the light corresponding to each of the viewpoints transmits at the first distance.

In the present embodiment, when the positional information relating to the viewpoint indicates the first value, three third electrodes 33 correspond to the transmissive region 301. When the positional information relating to the viewpoint indicates the second value, four third electrodes 33 correspond to the transmissive region 301. However, the present invention is not limited thereto.

As described above, in the display device 1 according to the present embodiment, the display controller 4 can change the number of successive pixels displaying an image corresponding to each of the viewpoints on the display unit 2, based on the positional information relating to the viewpoint. In addition, the parallax controller 5 can control the parallax adjustment 3 so that the successive pixels displaying an image corresponding to each of the changed viewpoints can be viewed at each of the viewpoints. Thus, when the parallax adjustment 3 becomes closer to the viewpoint so that the distance between the parallax adjustment 3 and the viewpoint is changed to the second distance that is shorter than the first distance, it is possible to apply a pixel signal associated with the same viewpoint to the adjacently arranged pixel corresponding to a different viewpoint that may be viewed when the distance between the parallax adjustment 3 and the viewpoint becomes closer to the second distance. Consequently, it is possible to suppress crosstalk that occurs by a signal associated with a different viewpoint being applied to the adjacently arranged pixel that may be viewed at the second distance. In the display device that displays a stereoscopic image, when the first viewpoint corresponds to the left eye, and the second viewpoint corresponds to the right eye, it is possible to expand the range in which the stereoscopic image can be viewed in the front-to-rear direction, while suppressing the occurrence of crosstalk.

It is preferable that the change of the number of successive pixels displaying an image corresponding to each of the viewpoints by the display controller 4, and the switching between the transmissive region 301 and the non-transmissive region 302 by the parallax controller 5 are performed at the same timing. Even if one of the operations by the display controller 4 and the parallax controller 5 is delayed, the operations are preferably performed at the same timing as timing of the delayed operation.

In the present embodiment, the display controller 4 changes the number of successive pixels corresponding to each of the viewpoints, based on the positional information relating to the viewpoint. For example, it has been described above that the number of successive pixels corresponding to each of the viewpoints is one when the positional information relating to the viewpoint indicates the first value, while the number of successive pixels corresponding to each of the viewpoints is two when the viewpoint becomes closer to the display unit 2 so that the positional information relating to the viewpoint indicates the second value. However, the present invention is not limited thereto. The display controller 4 may set the number of successive pixels corresponding to each of the viewpoints so that the number of pixels obtained when the positional information relating to the viewpoint indicates the second value is greater than the number of pixels obtained when the positional information relating to the viewpoint indicates the first value. For example, when the positional information relating to the viewpoint indicates the first value, the number of successive pixels set by the display controller 4 may be two. On the other hand, when the positional information relating to the viewpoint indicates the second value, the number of successive pixels corresponding each of the pixels may be four. Furthermore, in the present embodiment, the display controller 4 sets the different numbers of pixels between cases where the positional information relating to the viewpoint indicates the first value, and where the positional information relating to the viewpoint indicates the second value. However, the present invention is not limited thereto. In other words, the display controller 4 may set two or more values indicated by the positional information relating to the viewpoint, according to which the number of successive pixels is changed. For example, when the viewpoint becomes more closer to the parallax adjustment 3 than the case where the positional information relating to the viewpoint indicates the second value so that the positional information relating to the viewpoint indicates the third value, the display controller 4 may set the greater number (for example, three) of successive pixels corresponding to each of the viewpoints than the number of successive pixels that is set when the positional information relating to the viewpoint indicates the second value.

In the present embodiment, the display controller 4 changes the number of successive pixels corresponding to each of the viewpoints, based on the positional information relating to the viewpoint. The same pixel signal corresponding to the same viewpoint and the same color may be input to the successive pixels. In this case, when the distance between the viewpoint and the parallax adjustment 3 varies and the number of successive pixels corresponding to each of the viewpoints varies, it means that the size of the pixel to which the same pixel signal is input varies in a pseudo manner. The number of entire pixels is a fixed value that is determined at the time of manufacturing and does not increase. Thus, when the number of successive pixels to which the same pixel signal is input varies according to the changed number of pixels corresponding to each of the viewpoints, the resolution of an image to be displayed on the display unit 2 varies. In other words, the resolution of an image to be displayed varies according to the change of the positional information relating to the viewpoint.

Modification: Arrangement Pattern of Successive Pixels

Figure 12:
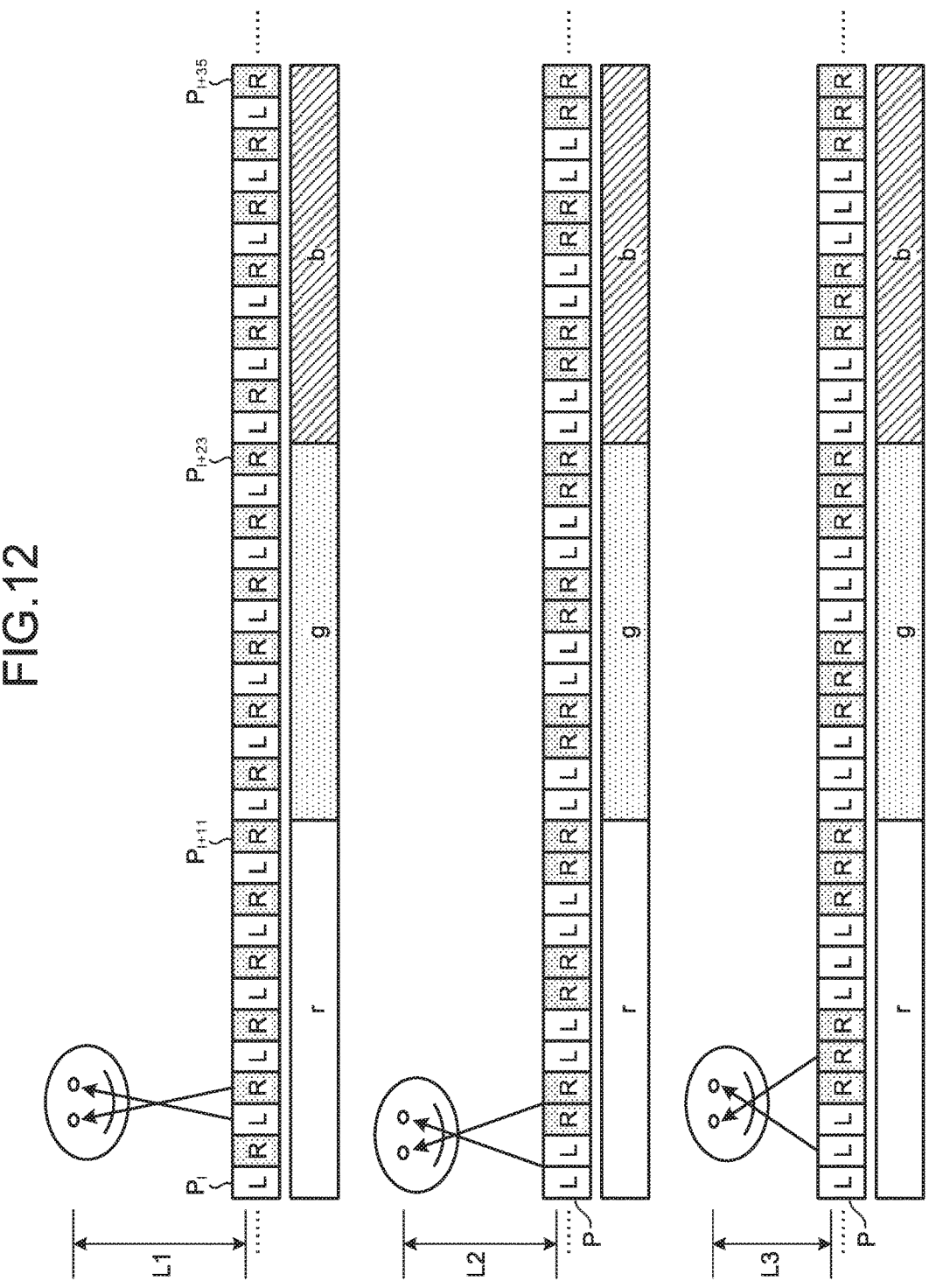
FIG. 12 is an explanatory diagram illustrating an example of an arrangement pattern of successive pixels associated with the same viewpoint.

FIG. 12 is an explanatory diagram illustrating an example of an arrangement pattern of successive pixels associated with the same viewpoint. When the positional information relating to the viewpoint indicates the first value, the display controller 4 sets the number of successive pixels corresponding to the viewpoint to one. When the positional information relating to the viewpoint indicates the second value, the display controller 4 sets the number of successive pixels corresponding to the viewpoint to two. When the positional information relating to the viewpoint indicates the third value, the display controller 4 sets the number of successive pixels corresponding to the viewpoint to three. The above case will now be described.

In the adjacent pixels $P_l$ to $P_{l+11}$, when the positional information relating to the viewpoint indicates the first value and the number of successive pixels corresponding to each of the viewpoints is one, the same pixel signal associated with the left eye (first viewpoint) and the same color is supplied to six pixels, the pixels $P_l$, $P_{l+2}$, $P_{l+4}$, $P_{l+6}$, $P_{l+8}$, and $P_{l+10}$. Meanwhile, the same pixel signal associated with the right eye (second viewpoint) and the same color (red) is supplied to six pixels, the pixels $P_{l+1}$, $P_{l+3}$, $P_{l+5}$, $P_{l+7}$, $P_{l+9}$, and $P_{l+11}$. While the positional information relating to the viewpoint indicates the second value and the number of successive pixels corresponding to each of the viewpoints is two, the same pixel signal associated with the left eye (first viewpoint) and the same color is supplied to six pixels, the pixels $P_l$, $P_{l+1}$, $P_{l+4}$, $P_{l+5}$, $P_{l+8}$, and $P_{l+9}$. Meanwhile, the same pixel signal associated with the right eye (second viewpoint) and the same color (red) is supplied to six pixels, $P_{l+2}$, $P_{l+3}$, $P_{l+6}$, $P_{l+7}$, $P_{l+10}$, and $P_{l+1}$. Furthermore, when the positional information relating to the viewpoint indicates the third value, and the number of successive pixels corresponding to each of the viewpoints is three, the same pixel signal associated with the left eye (first viewpoint) and the same color is supplied to six pixels, the pixels $P_l$, $P_{l+1}$, $P_{l+2}$, $P_{l+6}$, $P_{l+7}$, and $P_{l+8}$. Meanwhile, the same pixel signal associated with the right eye (second viewpoint) and the same color (red) is supplied to six pixels, the pixels $P_{l+3}$, $P_{l+4}$, $P_{l+5}$, $P_{l+9}$, $P_{l+10}$, and $P_{l+11}$. The color to be associated with the pixel is not limited to red. The same pixel signal is similarly supplied to six pixels associated with green and blue.

In this manner, even if the number of pixels corresponding to each of the successive pixels is varied by the change of the positional information relating to the viewpoint, the number of pixels to which the same pixel signal is supplied is six in common. In other words, the resolution of an image to be displayed on the display unit 2 does not change, and thus it is possible to prevent the observer from feeling uncomfortable due to the change in the resolution.

The number of successive pixels to which the same pixel signal is supplied is not limited thereto. Assume that the number of viewpoint is k; when the positional information relating to the viewpoint indicates the first value, the number of successive pixels displaying an image corresponding to each of the viewpoints is a (a≥1); and when the positional information relating to the viewpoint indicates the second value, the number of pixels displaying the same image corresponding to each of the viewpoints is b (b>a). In the pixels that are successively arranged, and the number of which corresponds to the least common multiple S of ka and kb, the same pixel signal associated with the same viewpoint and the same color, may be supplied to S/k pixels. When the colors corresponding to the respective pixels are fixed, as in the color filter 26, the same color is associated with the color filter 26 at the positions corresponding to at least S pixels.

In the present embodiment, the parallax controller 5 changes the position of the transmissive region 301 or the non-transmissive region 302 of the parallax adjustment 3, based on the positional information relating to the viewpoint. The parallax adjustment 3 changes the transmissive region 301 or the non-transmissive region 302 so that the pixels constituted of the successive pixels corresponding to each of the viewpoints changed by the display controller 4 are distributed into each of the viewpoints. The parallax controller 5 may change the position and the width of the transmissive region 301 or the non-transmissive region 302, by changing the width of the third electrodes 33 that form a single region to be controlled ranging from the center of a single non-transmissive region 302 to the center of the adjacent non-transmissive region 302. Alternatively, the parallax controller 5 may change the width of the non-transmissive region 302 or the transmissive region 301 within the single region to be controlled, without changing the width of the single region to be controlled.

First Modification

Figure 13:
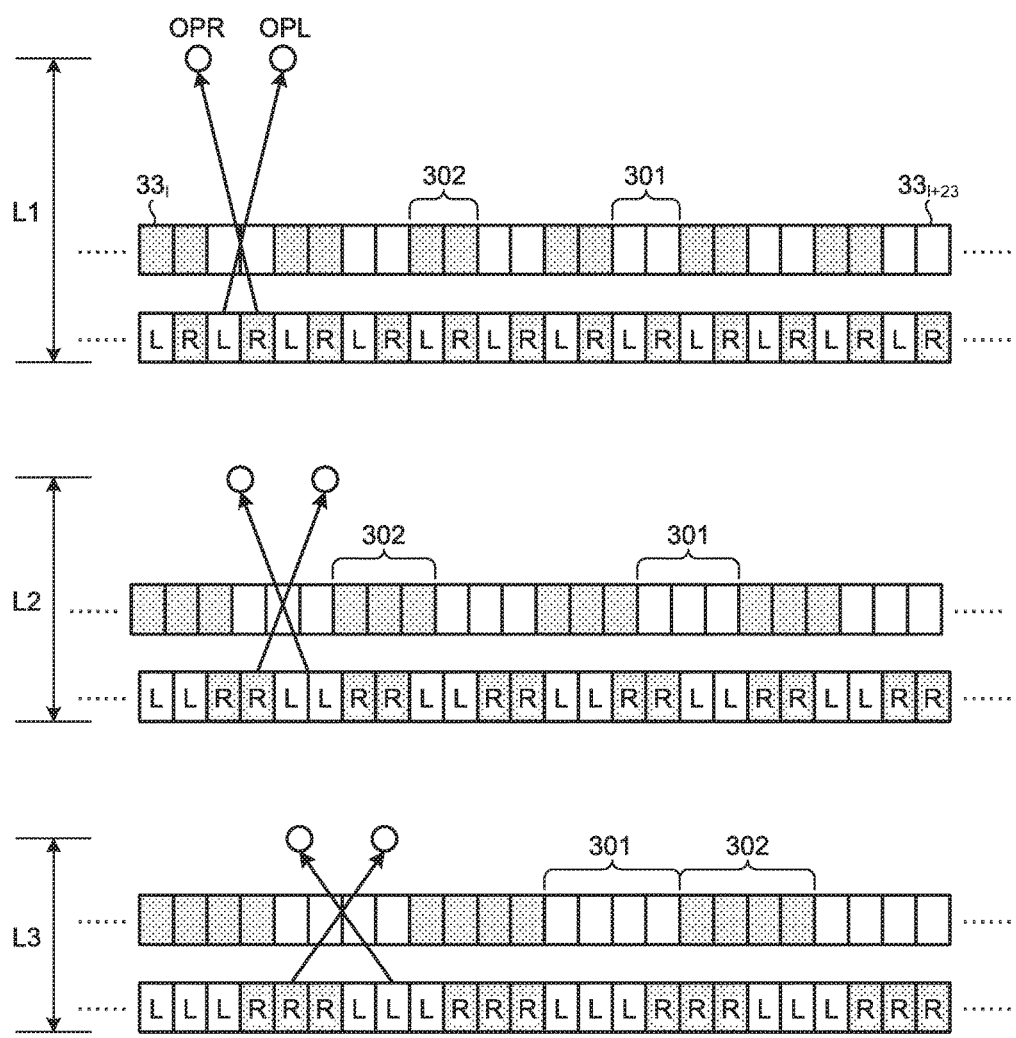
FIG. 13 is an explanatory diagram illustrating an example of an arrangement pattern of transmissive regions and non-transmissive regions in the parallax adjustment.

FIG. 13 is an explanatory diagram illustrating an example of an arrangement pattern of the transmissive regions and the non-transmissive regions in the parallax adjustment. For example, in a region corresponding to 24 third electrodes ranging from a third electrode $33_l$ to a third electrode $33_{l+23}$, when the positional information relating to the viewpoint indicates the first value, and the distance between the viewpoint and the parallax adjustment 3 is L1, the parallax controller 5 performs control to make a region corresponding to two third electrodes the transmissive region 301, and a region corresponding to two third electrodes the non-transmissive region 302. Thus, a region corresponding to 12 third electrodes, the third electrodes $33_{l+2}$, $33_{l+3}$, $33_{l+6}$, $33_{l+7}$, $33_{l+10}$, $33_{l+11}$, $33_{l+14}$, $33_{l+15}$, $33_{l+18}$, $33_{l+19}$, $33_{l+22}$, and $33_{l+23}$ becomes the transmissive region 301. For example, when the positional information relating to the viewpoint indicates the second value, and the distance between the viewpoint and the parallax adjustment 3 is L2, the parallax controller 5 performs control to make a region corresponding to three third electrodes the transmissive region 301, and a region corresponding to three third electrodes the non-transmissive region 302. Thus, a region corresponding to 12 third electrodes, the third electrodes $33_{l+3}$, $33_{l+4}$, $33_{l+5}$, $33_{l+9}$, $33_{l+10}$, $33_{l+11}$, $33_{l+15}$, $33_{l+16}$, $33_{l+17}$, $33_{l+21}$, $33_{l+22}$, and $33_{l+23}$ becomes the transmissive region 301. For example, when the positional information relating to the viewpoint indicates the third value, and the distance between the viewpoint and the parallax adjustment 3 is L3, the parallax controller 5 performs control to make a region corresponding to four third electrodes the transmissive region 301, and a region corresponding to four third electrodes the non-transmissive region 302. Thus, a region corresponding to 12 third electrodes, the third electrodes $33_{l+4}$, $33_{l+5}$, $33_{l+6}$, $33_{l+7}$, $33_{l+12}$, $33_{l+13}$, $33_{l+14}$, $33_{l+15}$, $33_{l+20}$, $33_{l+21}$, $33_{l+22}$, and $33_{l+23}$ becomes the transmissive region 301.

In this manner, when the positional information relating to the viewpoint varies, the area of the transmissive region 301 becomes the same, by the parallax controller 5 controlling the number of the third electrodes corresponding to the transmissive region 301 to be the same. Thus, it is possible to suppress the change in the intensity of light that transmits through the transmissive region 301. The number of the third electrodes corresponding to the transmissive region 301 and the number of the third electrodes corresponding to the non-transmissive region 302 are not limited thereto, and may be any number. Even if the positional information relating to the viewpoint takes any value, the ratio of the number of the third electrode 33 corresponding to the transmissive region 301 to the number of the third electrode 33 corresponding to the non-transmissive region 302 may be controlled not to change.

Second Modification

Figure 14:
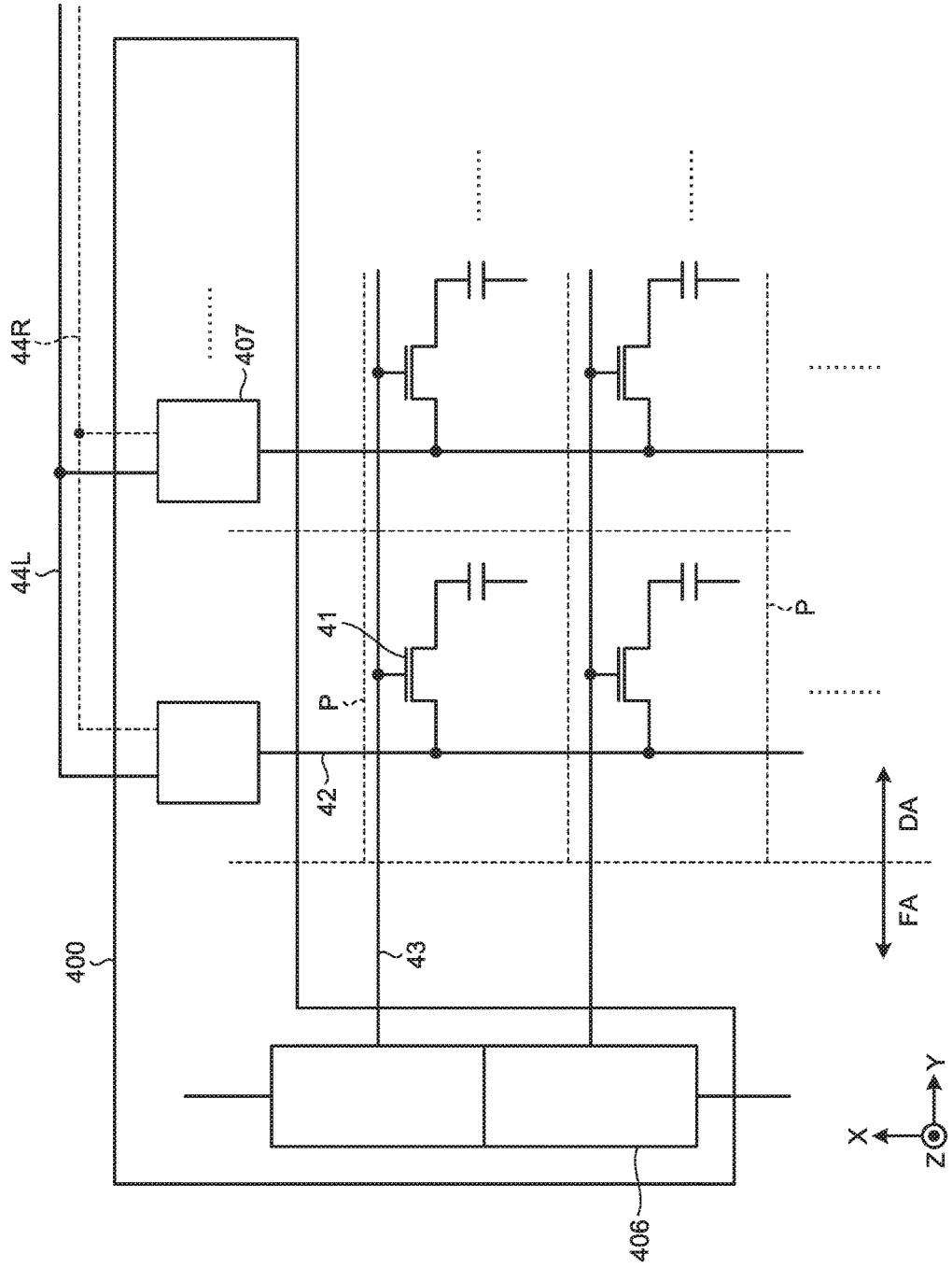
FIG. 14 is a schematic diagram illustrating another example of a circuit that constitutes the display controller.

In the present embodiment, the display controller 4 includes the switching elements according to the number of viewpoints in the pixel. However, the present invention is not limited thereto. FIG. 14 is a schematic diagram illustrating another example of a circuit that constitutes the display controller. In FIG. 14, a single switching element 41 is included in the pixel. The switching element 41 is a thin film transistor. The node or the drain of the transistor is coupled to a single signal line 42, and the gate of the transistor is coupled to a single gate line 43. In addition, a selection circuit 400 is disposed in a region outside the display region DA. The selection circuit 400 includes a switching circuit 407 that switches the connection of the signal line corresponding to each pixel row between a first viewpoint signal supply line 44L that supplies a pixel signal for the left eye (first viewpoint), and a second viewpoint signal supply line 44R that supplies a pixel signal for the right eye (second viewpoint). The gate line 43 coupled to the transistor includes a drive signal supply circuit 406. For example, the drive signal supply circuit 406 is a shift register, and sequentially applies signals to the gate lines 43, and supplies the signal to the pixel from either the first viewpoint signal supply line 44L or the second viewpoint signal supply line 44R, which is selected by the switching circuit 407. Consequently, it is possible to reduce the number of the switching elements, the signal lines, or the gate lines that are disposed in the pixel, thereby increasing the aperture ratio of the pixels.

In the non-display region FA, the display controller 4 includes signal supply lines corresponding to the respective viewpoints, such as the first viewpoint signal supply line 44L and the second viewpoint signal supply line 44R. However, the present invention is not limited thereto. In other words, instead of the configuration including the signal supply lines corresponding to the respective viewpoints and supplying pixel signals based on images corresponding to the respective viewpoints, a configuration of including a single signal supply line may be employed so that images corresponding to the respective viewpoints are generated, a composite image according to an arrangement pattern of the pixels corresponding to the respective viewpoints is generated, and then the pixel signal corresponding to the composite image is supplied.

Third Modification

Figure 15:
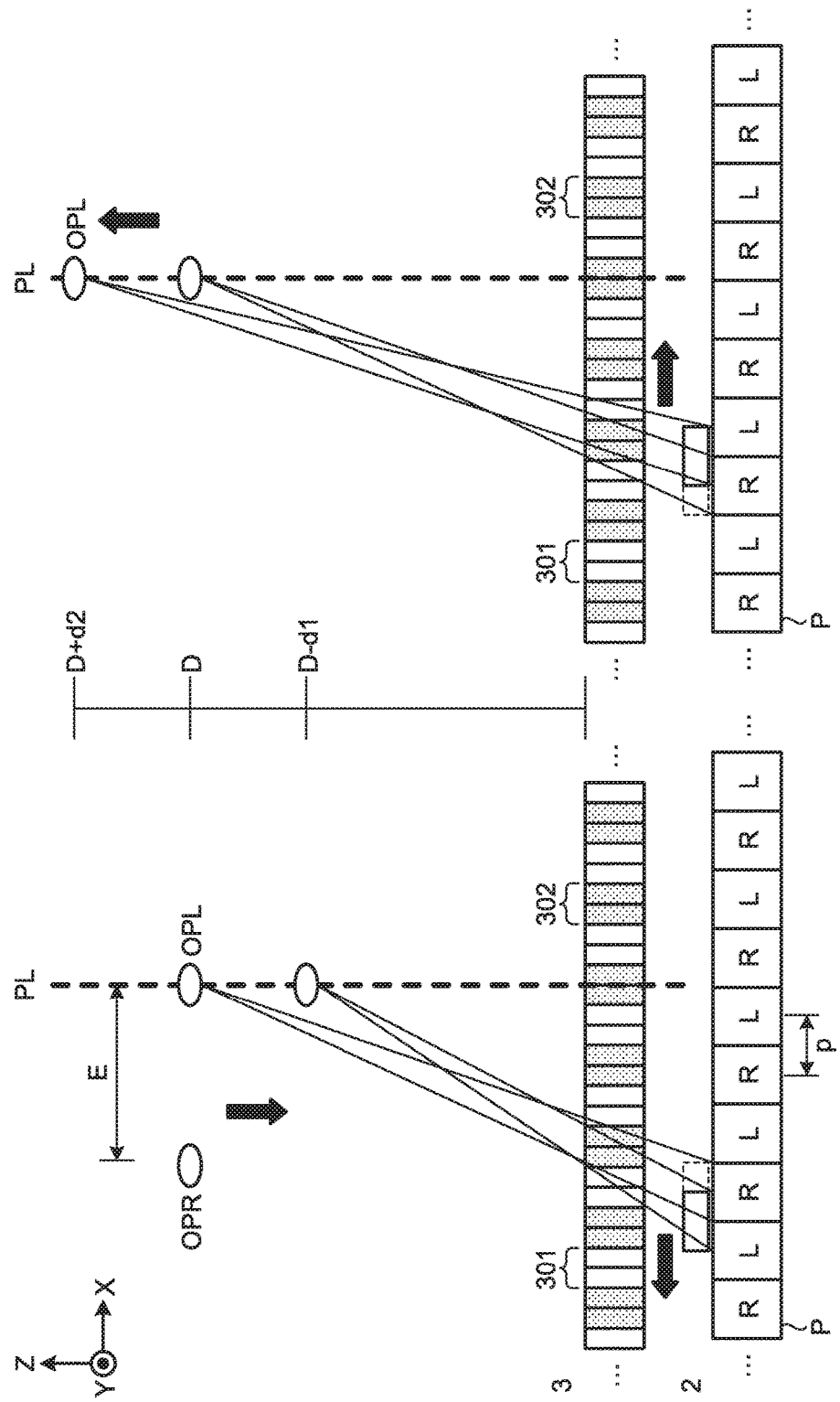
FIG. 15 is an explanatory diagram illustrating change in a region corresponding to at least one pixel to be viewed, corresponding to the non-transmissive region, when a distance between the viewpoint and the parallax adjustment is varied.
Figure 16:
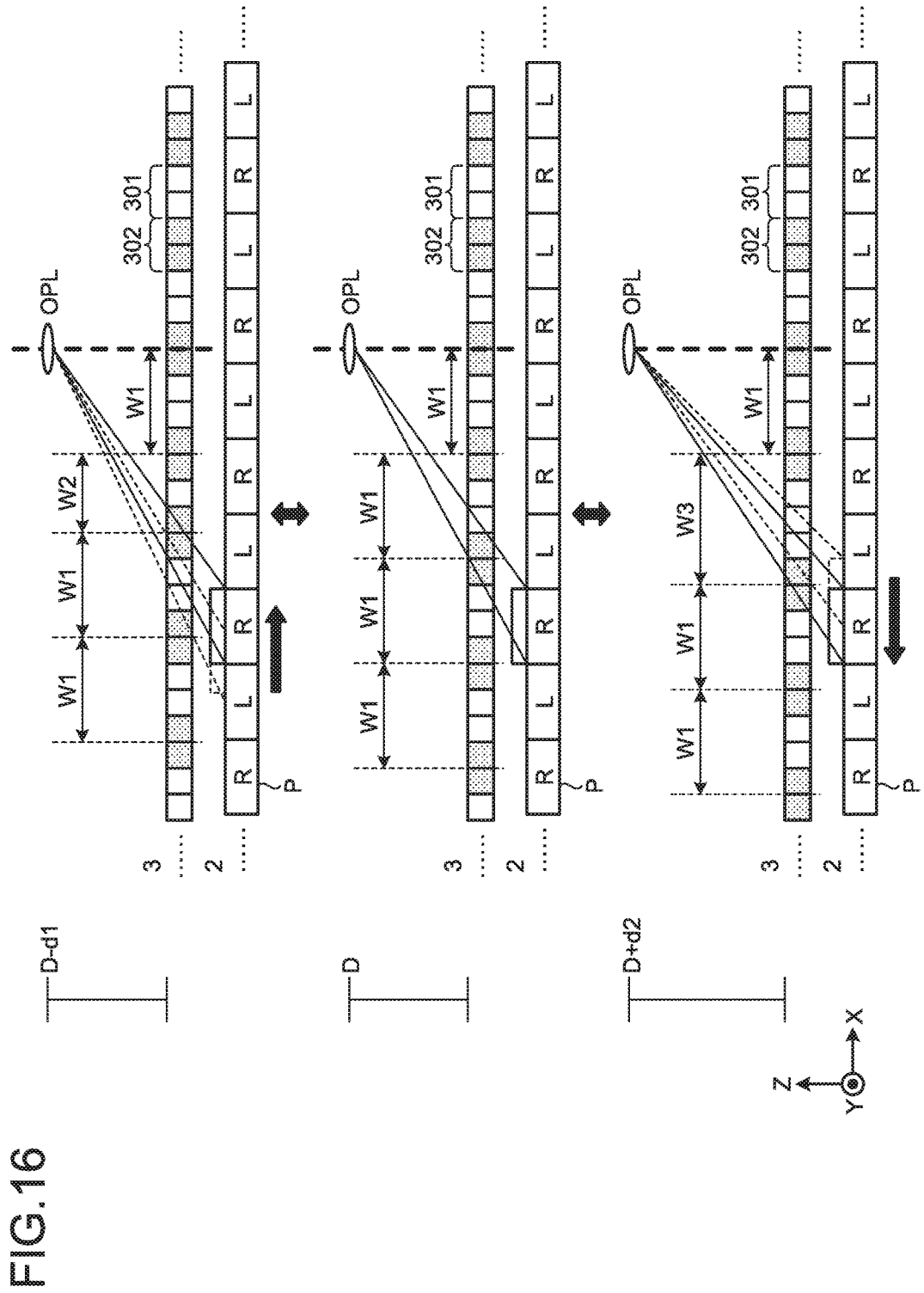
FIG. 16 is an explanatory diagram illustrating a modification example of the width of a region to be controlled in the parallax adjustment.

In the present embodiment, the width of the transmissive region 301 or the non-transmissive region 302 of the parallax adjustment 3 is uniform at least in the X axis direction. However, the present invention is not limited thereto. FIG. 15 is an explanatory diagram illustrating change in a region corresponding to at least one pixel to be viewed, corresponding to the non-transmissive region 302, when the distance between the viewpoint and the parallax adjustment 3 varies. FIG. 16 is an explanatory diagram illustrating a modification example of the width of a region to be controlled in the parallax adjustment 3. With reference to FIG. 15 and FIG. 16, the following describes a case where the parallax controller 5 changes at least one of the width of a part of the transmissive regions 301 or the width of a part of the non-transmissive regions 302 in the parallax adjustment 3, based on the positional information relating to the viewpoint. The region to be controlled in the parallax adjustment 3 is a region ranging from the center of the sequential non-transmissive regions 302 to the center of the subsequently sequential non-transmissive regions 302. Each of the regions to be controlled corresponds to the same number of the third electrodes 33. The parallax controller 5 performs control to apply electric charges to the regions to be controlled so that each of the regions to be controlled has the same number of the transmissive regions 301 and the non-transmissive regions 302 at the same position.

First, assume that the region to be controlled in the parallax adjustment 3 is constituted of two transmissive regions 301 and two non-transmissive regions 302, and the width of the region to be controlled is W1. When the distance between the first viewpoint OPL (left eye) and the parallax adjustment 3 is a predetermined reference distance D, a region corresponding to at least one pixel to be viewed in which light is limited by the predetermined non-transmissive region 302 becomes a region corresponding to the pixel P corresponding to the second viewpoint (right eye). Thus, the light from the pixel corresponding to a different viewpoint is appropriately limited. The predetermined reference distance D is an appropriate visual distance.

Next, assume that the distance between the first viewpoint OPL (left eye) and the parallax adjustment 3 is reduced by d1 from the reference distance D and the distance between the first viewpoint OPL (left eye) and the parallax adjustment 3 becomes D-d1. When the width W1 of the transmissive region 301 is not changed, the region corresponding to at least one pixel to be viewed in which light is limited by the predetermined non-transmissive region 302 varies, according to the distance between the viewpoint and the parallax adjustment 3.

For example, the region corresponding to at least one pixel to be viewed, in which light is limited by the predetermined non-transmissive region 302, moves in a direction separating from a perpendicular line PL that passes through the first viewpoint OPL (left eye) and that is perpendicular to a plane surface formed by the front surface of the parallax adjustment 3, from the position when the distance between the first viewpoint OPL (left eye) and the parallax adjustment 3 is the reference distance D.

Assume that the distance between the first viewpoint OPL (left eye) and the parallax adjustment 3 is increased by d2 from the reference distance D, and the distance between the first viewpoint OPL (left eye) and the parallax adjustment 3 becomes D+d2. When the width of the transmissive region 301 is not changed, the region corresponding to at least one pixel to be viewed in which light is limited by the predetermined non-transmissive region 302 varies, according to the distance between the viewpoint and the parallax adjustment 3.

For example, the region corresponding to at least one pixel to be viewed, in which light is limited by the predetermined non-transmissive region 302, moves in a direction approaching the perpendicular line PL that passes through the first viewpoint OPL (left eye) and that is perpendicular to the plane surface formed by the front surface of the parallax adjustment 3, from the position when the distance between the first viewpoint OPL (left eye) and the parallax adjustment 3 is the reference distance D.

The variation amount of the region corresponding to at least one pixel to be viewed in which light is limited by the non-transmissive region 302 is increased, as the distance between the first viewpoint (left eye) and the parallax adjustment 3 varies from the reference distance D. Thus, when the distance between the first viewpoint (left eye) and the parallax adjustment 3 varies largely from the reference distance D, the region corresponding to at least one pixel to be viewed, in which light is limited by the non-transmissive region 302, may be changed to the position that limits the light from the pixel associated with the first viewpoint (left eye). In other words, when the distance between the first viewpoint (left eye) and the parallax adjustment 3 varies largely from the reference distance D, the region corresponding to at least one pixel to be viewed, in which the light is transmitted by the transmissive region 301, may be changed to the position where the light from the pixel associated with the second viewpoint (right eye) is transmitted.

Thus, as illustrated in FIG. 16, when the first viewpoint OPL and the parallax adjustment 3 become closer to each other, and the distance between the first viewpoint OPL and the parallax adjustment 3 becomes D-d1, the parallax controller 5 changes the width of a part of the regions to be controlled from W1 to W2 that is smaller than W1. For example, the parallax controller 5 changes a part of the regions to be controlled to be a region controlled by three third electrodes 33, not by four third electrodes 33. Consequently, in the region to be controlled in which the number of the third electrodes 33 is changed, either the transmissive region 301 or the non-transmissive region 302 is reduced. Therefore, although the transmittance may vary, it is possible to move the position of the region corresponding to at least one pixel to be viewed, in which light is limited by the non-transmissive region 302, to an appropriate position.

More specifically, when the width of the pixel corresponding to each of the viewpoints is p, and the width between the first viewpoint (left eye) and the second viewpoint (right eye) is E, an appropriate width X1 of the region to be controlled at the reference distance D can be calculated by the following expression (1).

When the first viewpoint corresponds to the left eye and the second viewpoint corresponds to the right eye, E is the interocular distance, for example, 65 mm. At the predetermined reference distance D, the non-transmissive region 302 can limit the light from the pixel corresponding to the different viewpoint (second viewpoint). Thus, when W is the width corresponding to a single third electrode 33, X1 is substantially the same as nW.

$$X1 = 2pE/(p+E) \approx nW \quad (1)$$

An appropriate width X2 of the region to be controlled at the distance D-d1 obtained when the distance between the viewpoint and the parallax adjustment 3 is reduced by d1 from the reference distance D, can be calculated by the following expression (2).

$$X2 = 2pE/(pD/D-d1)+E) \quad (2)$$

Next, an accumulation Xa of deviation relative to the appropriate width X2 of the region to be controlled at the distance D-d1 can be calculated by the following expression (3). The accumulation Xa of deviation relative to the width X2 of the region to be controlled is a value obtained by multiplying the number B of regions to be controlled (the number of transmissive regions 301), by a difference (X2−X1) between the width X1 of the region to be controlled when the distance between the viewpoint and the parallax adjustment 3 is at the reference distance D, and the width X2 of the region to be controlled when the distance between the viewpoint and the parallax adjustment 3 is reduced by the distance d1.

$$Xa = (X2-X1) \times B \quad (3)$$

Comparison will be made below between the accumulation Xa of deviation relative to the width X2 of the region to be controlled and the width corresponding to the single third electrode 33. The maximum $n_1$ ($n_1$=1, 2, ..., N) that satisfies the next expression (4) is calculated. W is a width corresponding to the single third electrode 33.

$$Xa > n_1 \times W \quad (4)$$

When $n_1$=1, i.e., when the accumulation Xa of deviation relative to the width X2 of the region to be controlled becomes a value larger than the width W of the single third electrode 33, as illustrated in FIG. 16, the parallax controller 5 reduces the width of a part of the regions to be controlled included in the parallax adjustment 3. More specifically, the parallax controller 5 reduces the width of the transmissive region 301 by a portion corresponding to the width of the single third electrode 33, and shifts the successive pixels in the direction of an arrow by the reduced portion. In this case, a region deviated from the region to be controlled is generated at the end. The end region is preferably included in the non-transmissive region 302 so that the wiring and the like outside the display region cannot be viewed from an oblique direction.

Similarly, when $n_1$ takes a value of two or more, the width of a part of the regions to be controlled is reduced by a numerical value indicated by $n_1$. When $n_1$ is two or more, the width of a single region to be controlled may be reduced by two or more third electrodes 33. However, it is also possible to arrange the regions to be controlled, the width of each of which is reduced by a single third electrode 33. When the width of a part of the regions to be controlled varies, the width of the transmissive region 301 or the non-transmissive region 302 is reduced. Thus, the transmittance of such a region to be controlled varies compared to the region to be controlled, the width of which is not changed. Consequently, when the width of a single region to be controlled is changed by multiple third electrodes 33, the transmittance also varies accordingly. Therefore, by distributing the variation among the multiple regions to be controlled, it is possible to prevent the change in the transmittance from being viewed. Similarly, to arrange the regions to be controlled, the width of each of which is changed, the regions to be controlled may be uniformly arranged in the X axis direction so that the change in the transmittance is difficult to be viewed. For example, the regions to be controlled, the width of each of which is changed, are symmetrically arranged with the center portion of the barrier interposed therebetween.

As illustrated in FIG. 16, when the first viewpoint OPL moves away from the parallax adjustment 3, and the distance between the first viewpoint OPL and the parallax adjustment 3 becomes D+d2, the parallax controller 5 changes the width of a part of the regions to be controlled in the parallax adjustment 3 from W1 to W3 that is larger than W1. For example, the parallax controller 5 changes a part of the regions to be controlled from a region controlled by four third electrodes 33 to a region controlled by five third electrodes 33. Consequently, in the region to be controlled in which the number of the third electrodes 33 is changed, either the transmissive region 301 or the non-transmissive region 302 is increased. Therefore, although the transmittance varies, it is possible to move the position of the region corresponding to at least one pixel to be viewed in which light is limited by the non-transmissive region 302 to an appropriate position.

An appropriate width X3 of the region to be controlled at the distance D+d2 when the distance between the viewpoint and the parallax adjustment 3 is increased by d2 from the reference distance D, can be obtained by the following expression (5).

$$X3 = 2pE/(pD/(D+d2)+E) \quad (5)$$

Next, an accumulation Xb of the deviation relative to the width X3 of the region to be controlled at the distance D+d2 can be obtained by the expression (6). The accumulation Xb of the deviation relative to the width X3 of the region to be controlled is a value obtained by multiplying the number B of regions to be controlled (number of transmissive regions 301), by a difference (X1−X3) between the width X1 of the region to be controlled when the distance between the viewpoint and the parallax adjustment 3 is the reference distance D, and the width X3 of the region to be controlled when the distance between the viewpoint and the parallax adjustment 3 has increased by the distance d2.

$$Xb=(X1-X3)\times B \quad (6)$$

Comparison will be made below between the accumulation Xb of the deviation relative to the width X3 of the region to be controlled and the width corresponding to the single third electrode 33. The maximum $n_2$ ($n_1$=1, 2, ..., N) that satisfies the following expression (7) is calculated.

$$Xb > n_2 \times W \quad (7)$$

When, $n_2$=1, i.e., when the accumulation Xb of the deviation relative to the width X3 of the region to be controlled becomes a value larger than the width W of the single third electrode 33, as illustrated in FIG. 16, the parallax controller 5 increases the width of a part of the regions to be controlled included in the parallax adjustment 3. More specifically, the parallax controller 5 increases the width of the transmissive region 301 by a length corresponding to the width of the single third electrode 33, and shifts the successive pixels in the direction of an arrow by the increased width. In this case, a region deviated from the region to be controlled is generated at the end. It is preferable that at least the endmost region among the end regions is made into the non-transmissive region 302 so that the wiring and the like outside the display region cannot be viewed from the oblique direction.

Similarly, when $n_2$ takes a value of two or more, the width of a part of the regions to be controlled is increased by a numerical value indicated by $n_2$. When $n_2$ is two or more, the width of the single region to be controlled may be increased by two or more third electrodes 33. However, it is also possible to arrange the regions to be controlled, the width of which of which is increased by the single third electrode 33. When the width of a part of the regions to be controlled varies, the width of the transmissive region 301 or the non-transmissive region 302 is increased. Thus, the transmittance of such a region to be controlled varies compared to the region to be controlled, the width of which is not changed. Consequently, when the width of a single region to be controlled is changed by multiple third electrodes 33, the transmittance also varies accordingly. Therefore, by distributing the variation among the regions to be controlled, it is possible to suppress the change in the transmittance from being viewed. Similarly, to arrange the regions to be controlled, the width of each of which is changed, the regions to be controlled may be uniformly arranged in the X axis direction so that the change in the transmittance is difficult to be viewed. For example, the regions to be controlled, the width of each of which is changed, are symmetrically arranged with the center portion of the barrier interposed therebetween.

As described above, by changing the width of a part of the transmissive regions 301 or the non-transmissive regions 302 according to the distance between the viewpoint and the parallax adjustment 3, it is possible to adjust the position of the region to be controlled in the parallax adjustment 3, in accordance with an appropriate change in the width of the region to be controlled in the parallax adjustment 3 that occurs when the viewpoint moves in the front-to-rear direction relative to the parallax adjustment 3. In this manner, the non-transmissive region 302 can appropriately limit the light from the pixel corresponding to the different viewpoint. As a result, it is possible to suppress the crosstalk that occurs when the light from the pixel corresponding to the different viewpoint is viewed. In this example, the parallax controller 5 changes the width of a part of the transmissive regions 301 or the non-transmissive regions 302 according to the distance between the viewpoint and the parallax adjustment 3. However, the changing condition is not limited thereto. The width of a part of the transmissive regions 301 or the non-transmissive regions 302 may be changed based on the positional information relating to the viewpoint. For example, as the distance between the viewpoint and the parallax adjustment 3 becomes shorter, an angle formed by the viewpoint and the center of the transmissive region 301 increases. In this manner, the width of a part of the transmissive regions 301 or the non-transmissive regions 302 may be changed according to the angle formed by the viewpoint and the center of the transmissive region 301.

As indicated in the expressions (1) to (7), the appropriate width of the region to be controlled is a value defined by the width p of the pixel corresponding to each of the viewpoints and the predetermined reference distance D. In other words, the predetermined reference distance D depends on the width p of the pixel corresponding to each of the viewpoints and the width X1 of the region to be controlled.

In the present embodiment, the number of successive pixels corresponding to each of the viewpoints of the display unit 2 and the width of the transmissive region 301 or the non-transmissive region 302 of the parallax adjustment 3 vary, based on the positional information relating to the viewpoint. For example, when the number of successive pixels corresponding to each of the viewpoints varies, the width p of the pixel corresponding to each of the viewpoints also varies. Consequently, the width X1 of the region to be controlled and the reference distance D also vary.

In this manner, for example, the display controller 4 and the parallax controller 5 according to the present embodiment determine the number of successive pixels corresponding to each of the viewpoints and the value of the width X1 of the region to be controlled from the positional information relating to the viewpoint. The display controller 4 and the parallax controller 5 then vary the width of a part of the transmissive regions 301 or the non-transmissive regions 302, according to the distance between the reference distance D and the viewpoint based on the number of successive pixels corresponding to each of the viewpoints and the width X1 of the region to be controlled that are determined based on the positional information relating to the viewpoint. Consequently, it is possible to more appropriately suppress the transmittance of light from the pixel corresponding to the different viewpoint.

Electronic Apparatus

In the present embodiment, the display device to which the present invention is applied has been described. However, the present invention is applicable not only to the display device but also applicable to electronic apparatuses of various fields such as a television device, a digital camera, a note-type personal computer, a portable electronic apparatus such as a mobile phone, and a display unit for a vehicle. The following describes an example of an electronic apparatus to which the present invention is applied.

Figure 17:
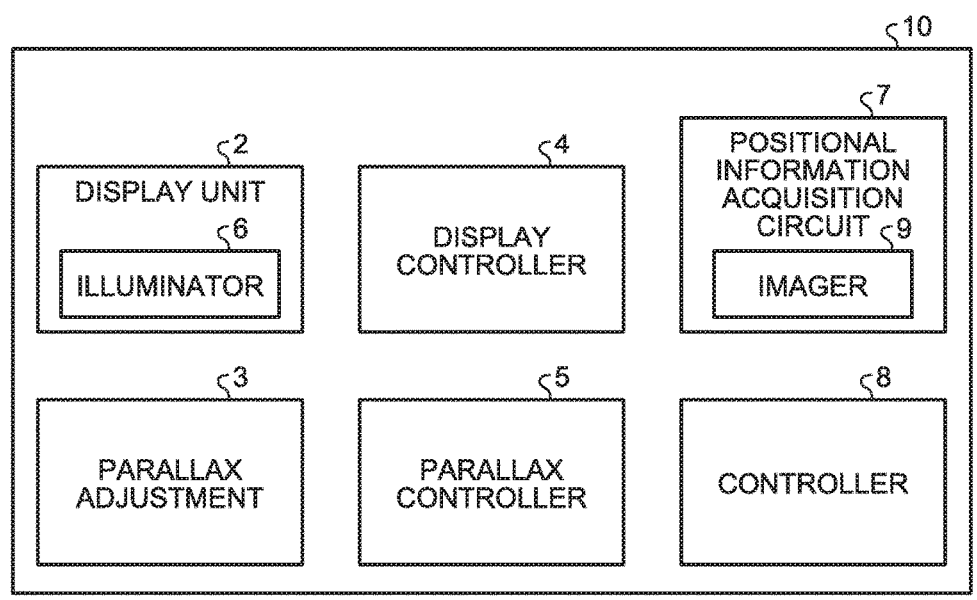
FIG. 17 is a block diagram illustrating an example of a functional configuration of an electronic apparatus to which the present invention is applied.

FIG. 17 is a block diagram illustrating an example of a functional configuration of an electronic apparatus to which the present invention is applied. Similarly to the display device 1, an electronic apparatus 10 to which the present invention is applied includes the display unit 2, the parallax adjustment 3, a positional information acquisition circuit 7, and a controller 8. The display unit 2 displays images corresponding to the respective viewpoints. The parallax adjustment 3 distributes the light from the pixel corresponding to each of the viewpoints, into each viewpoint. The positional information acquisition circuit 7 acquires positional information relating to the viewpoint. The controller 8 controls at least one of the display controller 4 and the parallax controller 5, based on the acquired positional information. The display unit 2 may include the illuminator 6 that emits light. The parallax adjustment 3 distributes the light from the display unit 2. The parallax adjustment 3 may include the transmissive regions 301 that transmit light and the non-transmissive regions 302 that limit light in a switchable manner. A detailed description of the components denoted by the same reference numerals will be omitted.

The positional information acquisition circuit 7 includes an imager 9 that captures an image of an observer corresponding to the viewpoint. For example, a digital camera is used for the imager 9. Based on the image captured by the imager 9, the positional information acquisition circuit 7 acquires positional information relating to the viewpoint. A method of acquiring the positional information relating to the viewpoint by the positional information acquisition circuit 7 is not limited thereto. For example, the positional information relating to the viewpoint may be acquired by using one or more of the imager 9, a temperature sensor such as an infrared sensor, a voice sensor such as a microphone, a sensor that can acquire the positional information such as an optical sensor.

The controller 8 applies a signal for controlling at least one of the display controller 4 and the parallax controller 5, based on the positional information relating to the viewpoint that is acquired by the positional information acquisition circuit 7. For example, the controller 8 determines the number of successive pixels corresponding to each of the viewpoints, based on the positional information relating to the viewpoint. The following describes when the number of successive pixels corresponding to each of the viewpoints changes by three steps, based on the positional information relating to the viewpoint. First, when the positional information relating to the viewpoint indicates the distance between the viewpoint and the parallax adjustment 3, and the distance between the viewpoint and the parallax adjustment 3 indicates a value larger than a predetermined first threshold, the controller 8 determines that the information relating to the viewpoint indicates the first value, and that the number of successive pixels corresponding to the viewpoint is the first number of pixels (for example, one). When the distance between the viewpoint and the parallax adjustment 3 is equal to or less than the predetermined first threshold and is larger than a second threshold, the controller 8 determines that the information relating to the viewpoint indicates the second value, and that the number of successive pixels corresponding to the viewpoint is the second number of pixels (for example, two). Furthermore, when the distance between the viewpoint and the parallax adjustment 3 is equal to or less than the predetermined second threshold, the controller 8 determines that the information relating to the viewpoint indicates the third value, and that the number of successive pixels corresponding to the viewpoint is the third number of pixels (for example, three). The controller 8 determines the number and the position of the third electrodes 33 corresponding to the transmissive region 301 or the non-transmissive region 302 of the parallax adjustment 3, according to the determined number of pixels. The controller 8 supplies a drive signal of the third electrode 33 to the parallax controller 5, based on the determination result.

The controller 8 determines the number and the position of the pixels corresponding to each of the viewpoints according to the determined number of pixels. The controller 8 supplies, based on the determination result, a selection signal for selecting an image corresponding to one of the viewpoints to be displayed on each of the pixels, to the display controller 4. The selection circuit 40 that constitutes the display controller 4 supplies a signal corresponding to the viewpoint that is associated with each of the pixels, to each pixel, based on the supplied selection signal.

For example, the calculation of the positional information relating to the viewpoint based on an image captured in the positional information acquisition circuit 7, and the generation of a signal supplied to the display controller 4 or the parallax controller 5 by the controller 8, are performed by a central processing unit (CPU) that is a processor formed on a fifth substrate that is different from the display unit 2 or the parallax adjustment 3, and a memory that is a storage device. A signal supplied to the display controller 4 or the parallax controller 5 from the controller 8 is supplied via a first wiring substrate 210 that is arranged on the display unit 2 or a second wiring substrate 310 (see FIG. 6) that is arranged on the parallax adjustment 3. A flexible printed circuit (FPC) may be used for the first wiring substrate 210 and the second wiring substrate 310.

A part or all of the functions of the positional information acquisition circuit 7 or the controller 8 may be performed by a first integrated circuit (IC) that is formed on the first substrate 21 of the display unit 2 or the first wiring substrate 210, or by a second integrated circuit that is formed on the third substrate 31 of the parallax adjustment 3 or the second wiring substrate 310. For example, the positional information relating to the viewpoint generated in the fifth substrate is supplied to the first integrated circuit and the second integrated circuit via the first wiring substrate and the second wiring substrate. Next, in the first integrated circuit, the number of successive pixels corresponding to each of the viewpoints is determined based on the received positional information relating to the viewpoint, and a selection signal for selecting an image corresponding to any of the viewpoints to be displayed on each of the pixels, is supplied to the display controller 4. In the second integrated circuit, the number of successive pixels corresponding to each of the viewpoints is determined based on the received positional information relating to the viewpoint, and a drive signal of the third electrode 33 is supplied to the parallax controller 5. In this example, the first integrated circuit and the second integrated circuit are included. However, the present invention is not limited thereto, and only one of the integrated circuits may be formed. For example, a configuration may be employed in which only the first integrated circuit is provided, and the second wiring substrate 310 is coupled to the first substrate 21 or the first wiring substrate 210, so that a drive signal of the third electrode 33 is generated in the first integrated circuit based on parallax information relating to the viewpoint and supplied via the second wiring substrate 310.

Control Method

Figure 18:
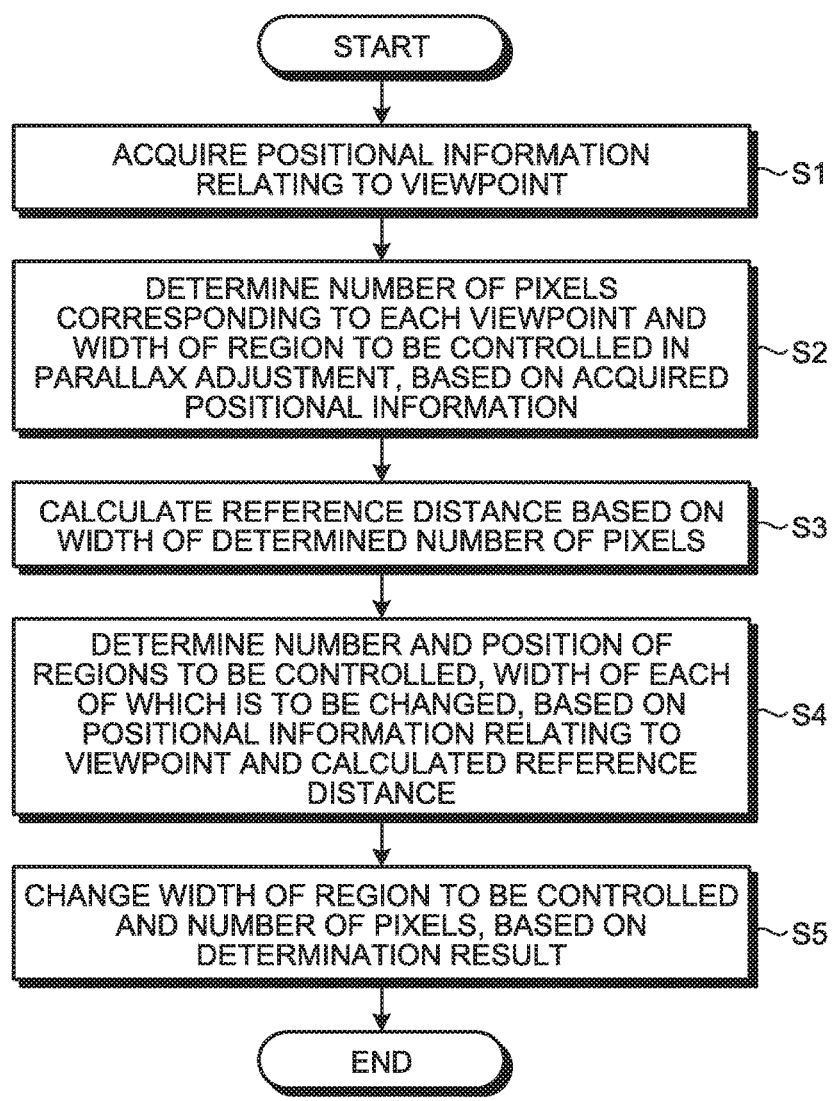
FIG. 18 is a flowchart illustrating an example of a control method performed by the electronic apparatus applied with the present invention.

As described above with reference to FIG. 15 and FIG. 16, the number of successive pixels corresponding to each of the viewpoints is changed, and the width of a part of the transmissive regions 301 or a part of the non-transmissive regions 302 is changed, based on the positional information relating to the viewpoint. The following describes details of the processes. FIG. 18 is a flowchart illustrating an example of a control method performed by the electronic apparatus to which the present invention is applied.

First, the positional information acquisition circuit 7 acquires positional information relating to the viewpoint (S1). For example, the positional information acquisition circuit 7 acquires the distance between the viewpoint and the parallax adjustment 3 as the positional information relating to the viewpoint, based on an image captured by the imager 9 included in the positional information acquisition circuit 7.

Next, the controller 8 determines the number of successive pixels corresponding to each of the viewpoints, and the width of the region to be controlled of the parallax adjustment 3, based on the acquired positional information (S2). For example, when the distance between the viewpoint and the parallax adjustment 3 indicates a value greater than the predetermined first threshold, the controller 8 determines that the information relating to the viewpoint indicates the first value, and that the number of successive pixels corresponding to the viewpoint is the first number of pixels (for example, one). When the distance between the viewpoint and the parallax adjustment 3 is equal to or less than the predetermined first threshold, the controller 8 determines that the information relating to the viewpoint indicates the second value, and that the number of successive pixels corresponding to the viewpoint is the second number of pixels (for example, two).

When the distance between the viewpoint and the parallax adjustment 3 indicates a value larger than the predetermined first threshold, the controller 8 determines that the information relating to the viewpoint indicates the first value, and that the region to be controlled in the parallax adjustment 3 is a region corresponding to four third electrodes 33. In other words, the controller 8 determines that the width of the region to be controlled corresponds to the width of four third electrodes 33. When the distance between the viewpoint and the parallax adjustment 3 is equal to or less than the predetermined first threshold, the controller 8 determines that the information relating to the viewpoint indicates the second value, and that the region to be controlled in the parallax adjustment 3 is a region corresponding to six third electrodes 33. In other words, the controller 8 determines that the width of the region to be controlled corresponds to the width of six third electrodes 33.

Furthermore, the controller 8 calculates the reference distance based on the width of the determined number of successive pixels (S3). For example, when the width of the determined number of successive pixels is p, the distance between the display unit 2 and the parallax adjustment 3 is G, and the interocular distance is E, the reference distance D can be calculated by the following expression (8).

$$D = EG/P \quad (8)$$

The controller 8 determines the number and the position of the regions to be controlled, the width of each of which is to be changed, based on the positional information relating to the viewpoint and the calculated reference distance D (S4). For example, the controller 8 calculates the expressions (2) to (4) or the expressions (5) to (7) based on a difference between the acquired distance between the viewpoint and the parallax adjustment 3, and the reference distance D to determine the position and the number of the regions to be controlled, the width of each of which is to be changed.

Finally, the display controller 4 and the parallax controller 5 change the width of the region to be controlled and the number of successive pixels, based on the determination result (S5). For example, the display controller 4 controls the display unit 2 to have the number of successive pixels corresponding to each of the viewpoints as determined at S2. The parallax controller 5 changes the positions of the transmissive regions 301 and the non-transmissive regions 302 based on the number and the position of the regions to be controlled having different widths, which are determined at S4, and the width of the region to be controlled that is determined at S2.

In the above flowchart, the electronic apparatus that includes the positional information acquisition circuit 7 and the controller 8 performs the operation. However, the present invention is not limited thereto. The display device 1 to which the present invention is applied may also acquire the positional information from the outside (S1), and change the number of successive pixels displaying an image corresponding to each of the viewpoints, by changing the positions of the transmissive regions 301 and the non-transmissive regions 302 based on the positional information relating to the viewpoint, by the display controller 4 and the parallax controller 5 (S2 to S5).

At S3, the reference distance is calculated by using the expression (8). However, the present invention is not limited thereto. The reference distance may also be calculated based on the number of successive pixels corresponding to each of the viewpoints and the width of the region to be controlled that can be set in advance, and a numerical value associated with the positional information relating to the viewpoint may be stored as table data in a memory included in at least one of the display controller 4, the parallax controller 5, and the controller 8.

In addition, at S4, the number and the position of the regions to be controlled, the width of each of which is to be changed, is calculated using the expressions (2) to (4) or the expressions (5) to (7). However, the present invention is not limited thereto. The number and the position of the regions to be controlled, the width of each of which is to be changed, may also be calculated based on the number of successive pixels corresponding to each of the viewpoints, the width of the region to be controlled, and the reference distance that can be set in advance, and a numerical value associated with the positional information relating to the viewpoint may be stored as table data in the memory that is included in the region to be controlled. It is also possible to omit the process at S4, and perform the process at S5 without changing the width of a part of the regions to be controlled.

FIG. 19 is a diagram illustrating an example of table data stored in a memory. By storing such table data in the memory of at least one of the display controller 4, the parallax controller 5, and the controller 8, one of the controllers reads out the data table from the memory, and determines in which of the data range in the first column the distance L between the viewpoint and the parallax controller 5 acquired at S1 is included. Consequently, it is possible to determine the number of successive pixels corresponding to each of the viewpoints, the number of electrodes corresponding to the region to be controlled, and the number and the position of the regions to be controlled, the width of each of which is to be changed. Thus, it is possible to omit or simplify the processes S2 to S4.

In the present embodiment, the transmissive liquid crystal display device is used as the display unit 2 of the display device 1. However, the present invention is not limited thereto. For example, the display unit 2 of the display device 1 may be a reflective liquid crystal display device or a transflective liquid crystal display device. In the reflective liquid crystal display device, the pixel electrode or the common electrode is formed of a member that reflects light so that a reflection layer that reflects external light is provided. The transflective liquid crystal display device is a combination of the transmissive liquid crystal display device and the transflective liquid crystal display device. For example, the display unit 2 of the display device 1 is not limited to the liquid crystal display device, and may also be an organic electro-luminescence (OEL) display, a micro electro mechanical system (MEMS), and the like.

When the display unit 2 is a display device that uses a self-light emitting element such as the reflective liquid crystal display device or the OEL, the display unit 2 need not include the illuminator 6 or a polarizing plate. When the display unit 2 is a display device that includes a reflection layer such as the reflective liquid crystal display device, an image may be displayed by reflecting the light from the illuminator 6, using the illuminator 6 as a front light that is arranged closer to the display surface side (observer side) than the reflection layer.

In the present embodiment, the parallax adjustment 3 is arranged on the front surface side of the display unit 2. However, the present invention is not limited thereto, and the parallax adjustment 3 may be arranged between the display panel 20 and the illuminator 6. By arranging the parallax adjustment 3 in this manner, the parallax adjustment 3 can adjust the light that is transmitted to the pixels of the display units 2, by transmitting the light from the illuminator 6 through the transmissive region 301, and limiting the light from the illuminator 6 by the non-transmissive region 302. Thus, similarly to the present embodiment, the parallax adjustment 3 can distribute the light from the pixel corresponding to each of the viewpoints, into each viewpoint.

In the present embodiment, the first electrode 23 and the second electrode 24 that constitute the display function layer 200 of the display unit 2 are sequentially stacked in the order of the first electrode 23, the insulating layer, and the second electrode 24. However, the present invention is not limited thereto. The first electrode 23 and the second electrode 24 may be arranged in the same layer via the insulating layer. In the present embodiment, the display unit 2 is the transmissive liquid crystal display device and is the liquid crystal display device in a horizontal electric field mode in which both the first electrode 23 and the second electrode 24 are formed on one of the first substrate 21 and the second substrate 22. However, the present invention is not limited thereto, and the display unit 2 may be the liquid crystal display device in a vertical electric field mode in which the first electrode 23 is arranged on one of the first substrate 21 and the second substrate 22, and the second electrode 24 is arranged on the other of the first substrate 21 and the second substrate 22.

Furthermore, in the present embodiment, the second electrode 24 is a plate-shaped electrode facing the first electrodes 23. However, the present invention is not limited thereto. The second electrode 24 may be a single electrode that does not include a slit in the display region and that faces all of the first electrodes 23. The second electrode 24 may also be a stripe-shaped electrode in which slits are formed at a predetermined interval in either the X direction or the Y direction. The second electrode 24 may also be an electrode in which slits are formed in both the X direction and the Y direction, and block-shaped electrodes are arranged in a matrix. In the present embodiment, the fourth electrode 34 is a plate-shaped electrode facing the third electrodes 33. However, the present invention is not limited thereto. The fourth electrode 34 may be a single electrode that does not include a slit in the display region and that faces all of the third electrodes 33. The fourth electrode 34 may also be a stripe-shaped electrode in which slits are formed at a predetermined interval in either the X direction or the Y direction. The fourth electrode 34 may also be an electrode in which slits are formed in both the X direction and the Y direction, and block-shaped electrodes are arranged in a matrix.

In the present embodiment, the colors associated with the respective pixels are three colors, i.e., red, green, and blue. However, the present invention is not limited thereto. The colors associated with the respective pixels may be a combination of other colors including white, or may be different colors of four or more. When the color filters 26 are used to associate the colors with the respective pixels, white may be associated with the pixel without arranging a color filter other than the color filters 26 colored in the respective colors, or by using a color filter not being colored. The display device 1 is not limited to a color display device arranged with the color filters 26. The display device 1 may also be a monochromatic display device without a color filter.

Figure 20:
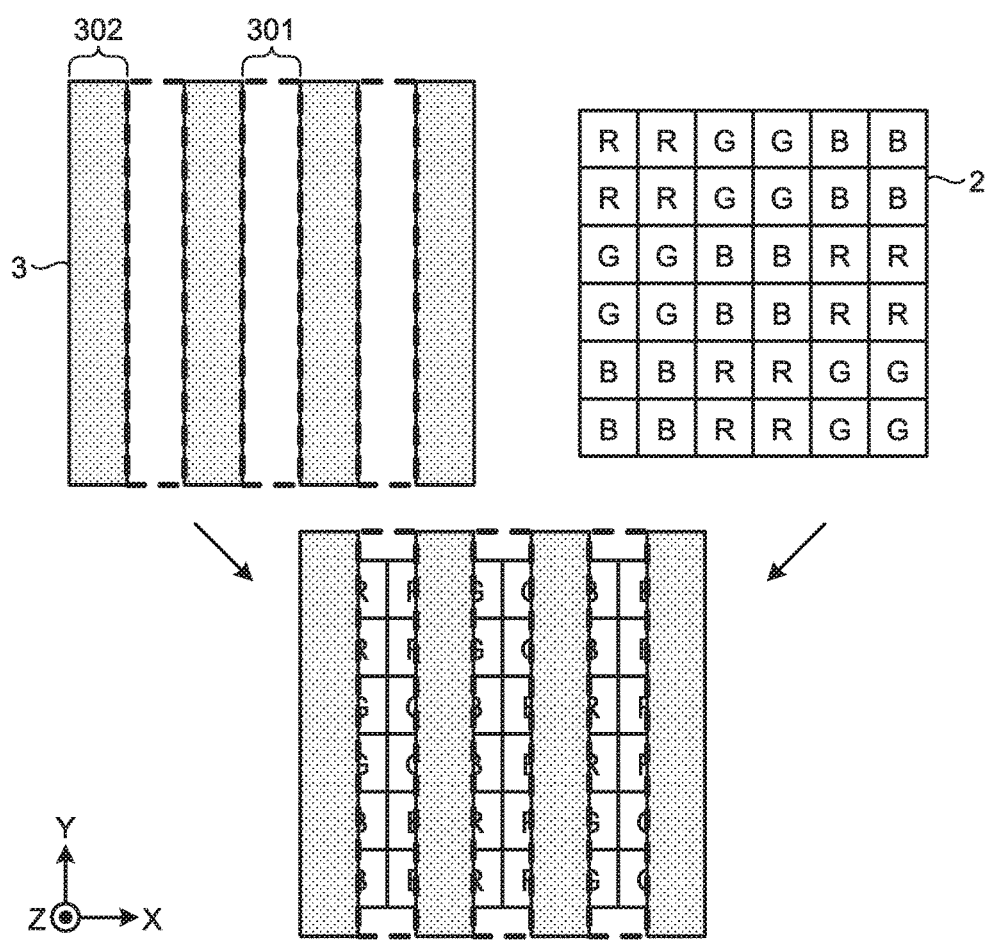
FIG. 20 is a diagram illustrating another example of the arrangement pattern of colors associated with the display unit.

In the present embodiment, in the display unit 2, the pixels are arranged so that the same color is associated with the pixels in the Y axis direction in which the transmissive regions 301 are sequentially formed. However, the present invention is not limited thereto. FIG. 20 is a diagram illustrating another example of the arrangement pattern of colors associated with the display unit 2. In the parallax adjustment 3, the transmissive regions 301 extend in the Y axis direction, and the transmissive regions 301 and the non-transmissive regions 302 are alternately arranged in the X axis direction. In the display unit 2, the pixels corresponding to different colors are arranged periodically not only in the X axis direction, but also in the Y axis direction. In this manner, the colors associated with the respective pixels that are arranged on the Y axis along which the transmissive regions 301 are sequentially formed, are arranged so as to change periodically. Thus, compared with the case where the pixels corresponding to the same color are arranged in the Y axis direction, the pixels associated with the same color appear as a straight line, even if the light that transmits through the adjacently arranged pixel can be viewed. This can suppress the light that passes through the adjacently arranged pixel from being viewed. In this example, the cycle of the pixels corresponding to the same color that are sequentially arranged in the Y axis direction, is two. However, the present invention is not limited thereto. The period of the pixels corresponding to the same color that are sequentially arranged in the Y axis direction may be any number, as long as the period corresponds to one or more pixels, and the pixels corresponding to different colors are arranged at least in the Y axis direction.

In the present embodiment, the third electrodes 33 are formed on the third substrate 31, and the fourth electrode 34 facing the third electrodes 33 is arranged on the fourth substrate 32. However, the forming position of the third electrodes 33 and the fourth electrode 34 is not limited thereto. Arrangement of the electrodes may be such that in a horizontal electric field mode, both the third electrodes 33 and the fourth electrode 34 are arranged via the insulating layer on one of the third substrate 31 or the fourth substrate 32. Arrangement of the electrodes may also be such that in a vertical electric field mode, one of the third electrodes 33 and the fourth electrode 34 is arranged on the third substrate 31, and the other of the third electrodes 33 and the fourth electrode 34 is arranged on the fourth substrate 32. In the present embodiment, the width of the third electrodes 33 is fixed. However, the width of a part of the third electrodes 33 may be changed.

In the present embodiment, the transmissive region 301 and the non-transmissive region 302 are rectangular-shaped regions that extend in the Y axis direction, and that are arranged in the X axis direction. However, the present invention is not limited thereto, and any configuration may be employed as long as the transmissive regions 301 and the non-transmissive regions 302 are arranged alternately. For example, the transmissive regions 301 may be arranged so as to extend in the oblique direction having a fixed angle relative to the Y axis direction or the X axis direction. When the transmissive regions 301 are to be formed in the oblique direction, the regions may be formed in a step-like shape along the shape of the pixel. When the transmissive regions 301 are to be formed in the oblique direction, the third electrodes 33 may be formed so as to extend in the oblique direction having a constant angle relative to the Y axis direction or the X axis direction along the transmissive regions 301. Furthermore, when the transmissive regions 301 are to be formed in a step-like shape along the shape of the pixel, the third electrodes may be similarly formed in a step-like shape.

Figure 21:
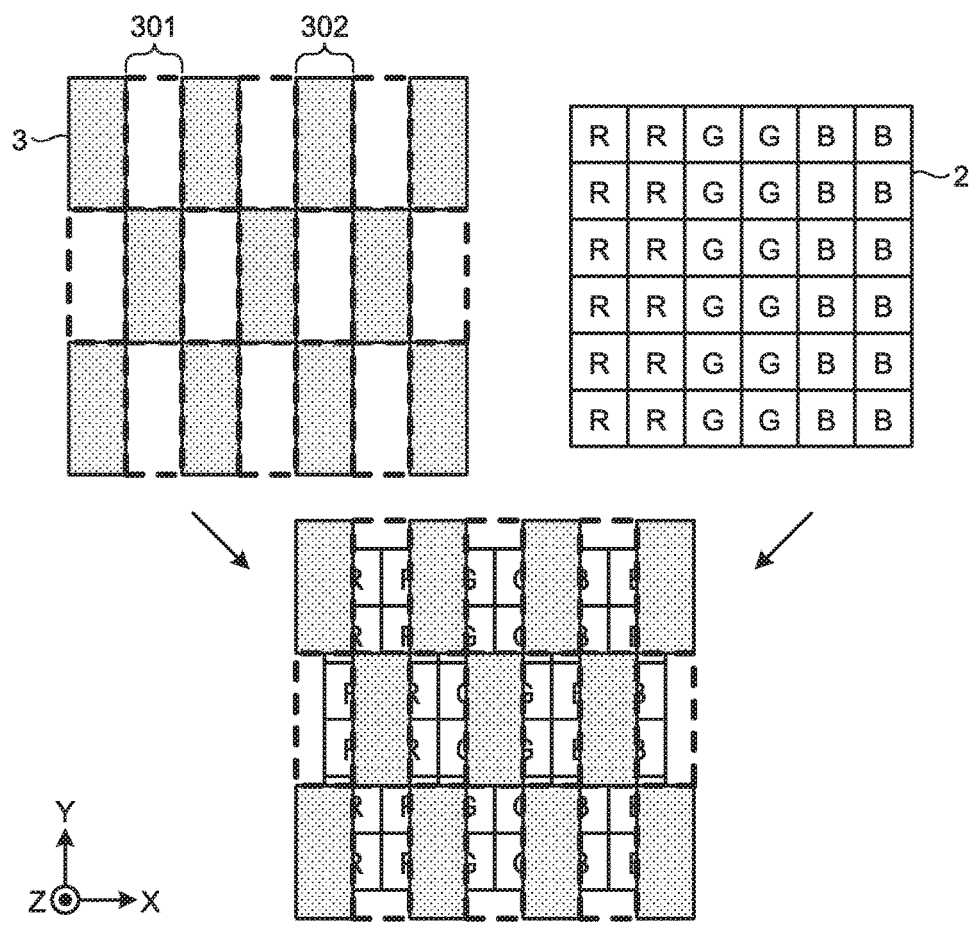
FIG. 21 is a diagram illustrating an example when the parallax adjustment forms the transmissive regions in an oblique direction.

FIG. 21 is a diagram illustrating an example when the transmissive regions 301 are formed in the oblique direction. In the parallax adjustment 3, the transmissive regions 301 and the non-transmissive regions 302 are periodically arranged both in the X axis direction and the Y axis direction. The transmissive regions 301 are arranged such that the center axis of each of the transmissive regions 301 is positioned in the oblique direction relative to the Y axis. In the display unit 2, the pixels associated with the same color are sequentially arranged in the Y axis direction, and the pixels associated with different colors are periodically arranged in the X axis direction. When the transmissive regions 301 are formed along the direction different from the direction in which the pixels are arranged, even if the pixels associated with the same color are sequentially arranged in one of the X axis direction and the Y axis direction, the transmissive regions 301 and the non-transmissive regions 302 are alternately arranged in the X axis direction or the Y axis direction. Thus, it is possible to reduce the number of sequential pixels associated with the same color to be viewed in the sequentially arranged transmissive regions 301. Therefore, regarding a pixel adjacent to the pixel that is viewed through the transmissive region 301, it is also possible to reduce the number of sequential pixels associated with the same color to be viewed. Consequently, it is possible to suppress the coloration due to the light leakage from the adjacently arranged pixel from being viewed as a line.

In the present embodiment, the parallax adjustment 3 constitutes a parallax barrier that forms the transmissive region 301 for transmitting light and the non-transmissive region 302 for limiting the transmittance of light. However, the configuration of the parallax adjustment 3 is not limited thereto. For example, a liquid crystal lens may be formed, by applying stepwise different electric charges to the region to be controlled that includes the predetermined number of third electrodes.

Figure 22:
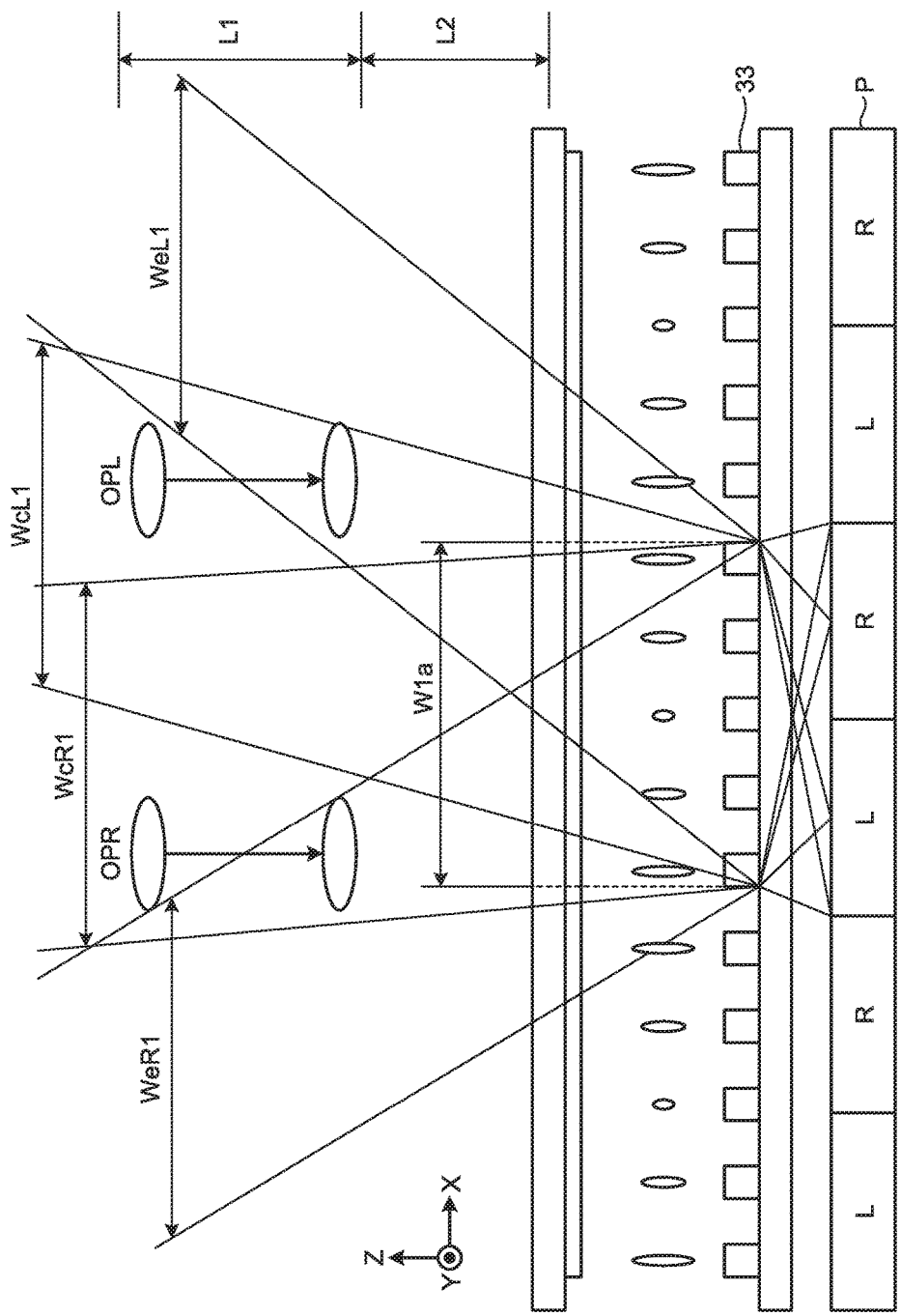
FIG. 22 is a diagram for explaining an operation performed in a comparative example, when the parallax adjustment is a liquid crystal lens.
Figure 23:
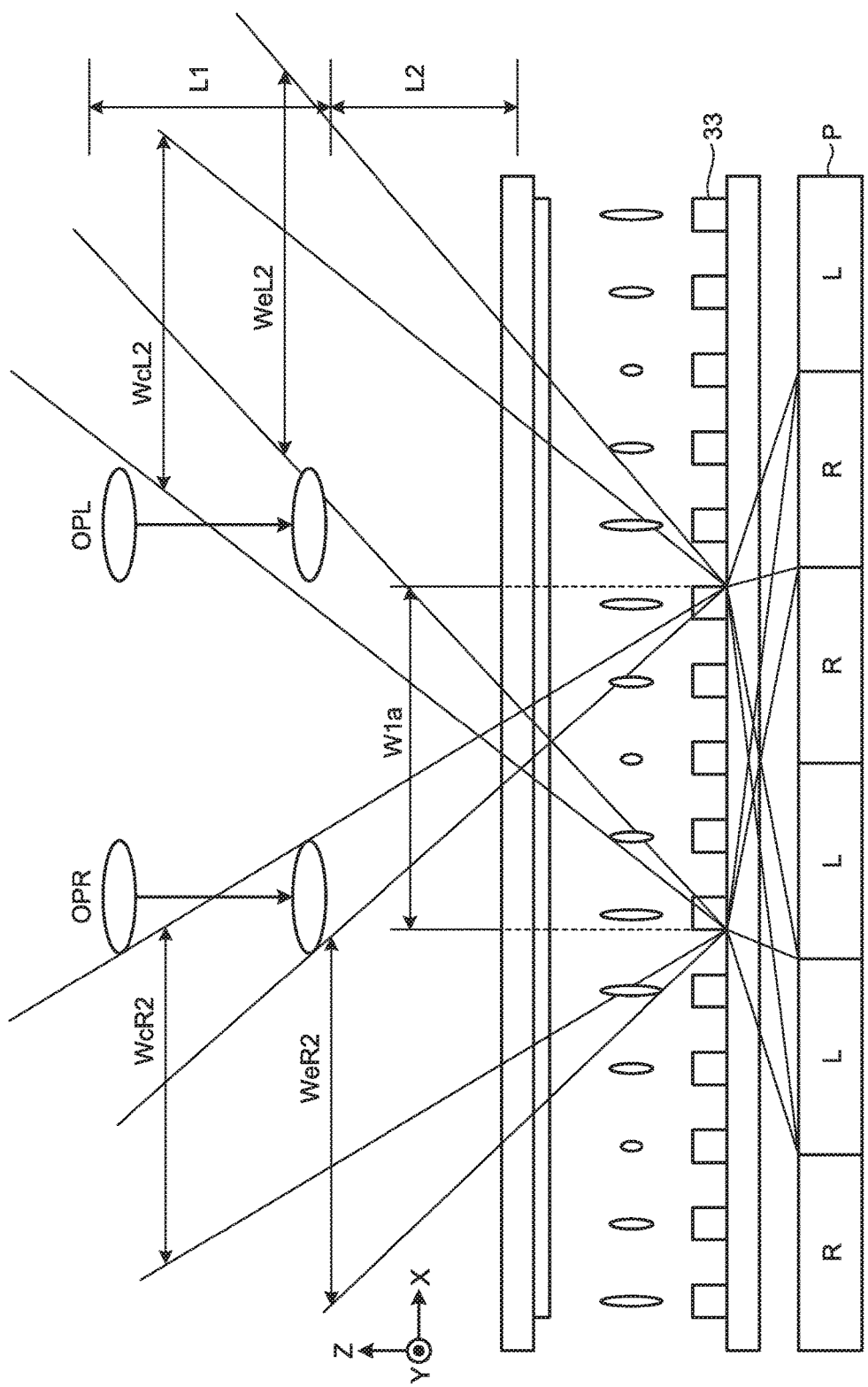
FIG. 23 is a diagram for explaining an operation performed in the present embodiment, when the parallax adjustment is the liquid crystal lens.
Figure 24:
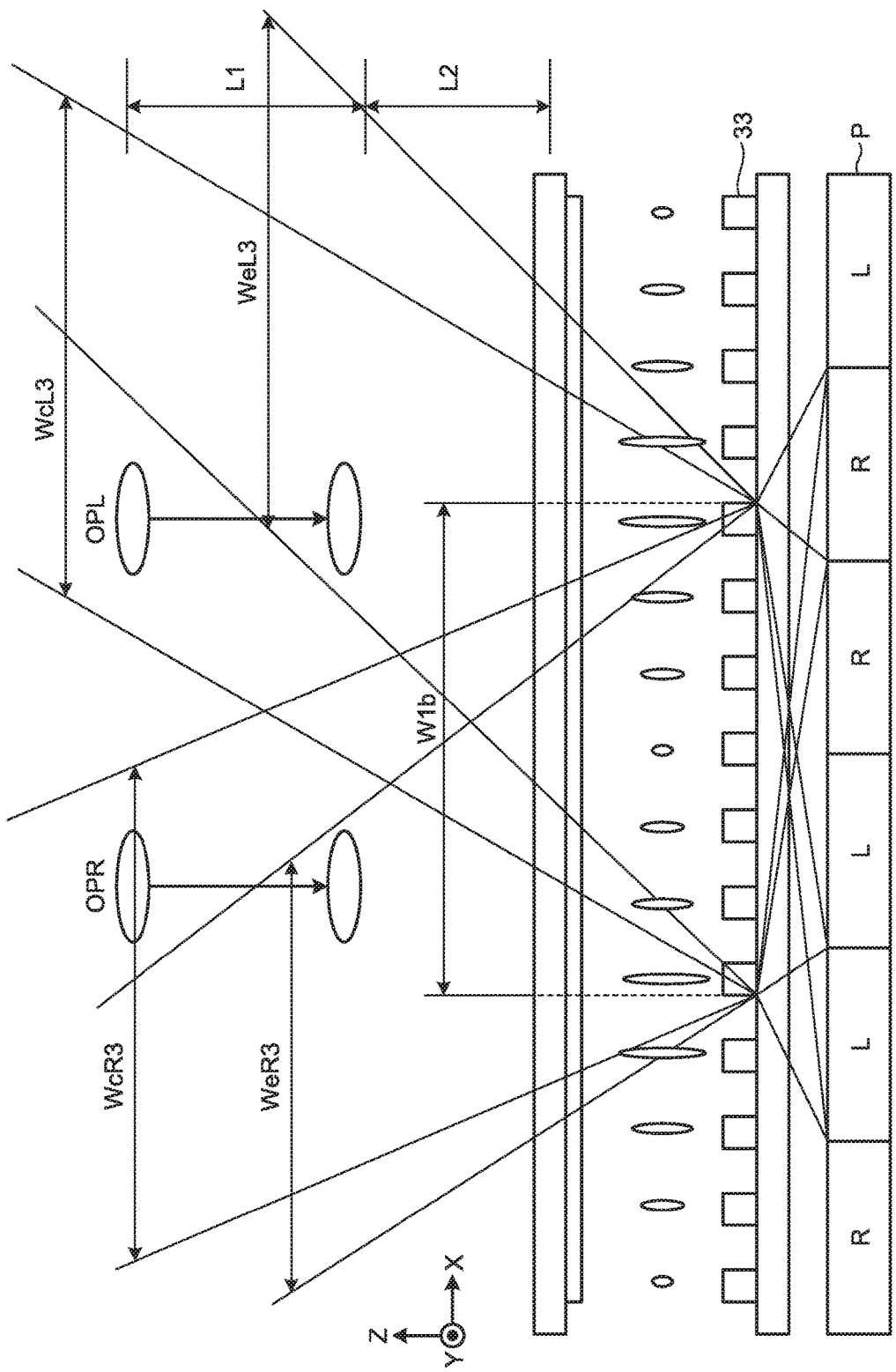
FIG. 24 is a diagram for explaining another operation performed by the parallax adjustment, when the positional information relating to the viewpoint indicates the second value.

FIG. 22 is a diagram for explaining an operation performed in a comparative example, when a liquid crystal lens is used for the parallax adjustment 3. FIG. 23 is a diagram for explaining an operation performed in the present embodiment, when the liquid crystal lens is used for the parallax adjustment 3. FIG. 24 is a diagram for explaining another operation performed by the parallax adjustment 3, when the positional information relating to the viewpoint indicates the second value. The liquid crystal lens may be a Fresnel lens and the like, but in this example, the liquid crystal lens is a convex lens. For example, when the positional information relating to the viewpoint indicates the first value, and the distance between the viewpoint and the parallax adjustment 3 is L1, the display controller 4 and the parallax controller 5 are controlled as follows. The display controller 4 controls the number of successive pixels corresponding to each of the viewpoints to be one, the parallax controller 5 applies stepwise different electric charges to the region to be controlled made of the third electrodes (for example, five), and thus a convex lens is formed. The width of the region to be controlled when the positional information relating to the viewpoint indicates the first value is W1a.

The light from each of the pixels is output as parallel light having different angles relative to the line perpendicular to the front surface of the parallax adjustment 3, via the formed convex lens.

A range in which the light that passes through the center position of the pixel PL corresponding to the first viewpoint becomes parallel light by the convex lens is WcL1. In addition, a range in which the light that passes through the boundary position between the pixel PL corresponding to the first viewpoint and the pixel PR corresponding to the second viewpoint that is adjacent to the pixel PL becomes parallel light by the convex lens is WeL1.

Meanwhile, a range in which the light that passes through the center position of the pixel PR corresponding to the second viewpoint becomes parallel light by the convex lens is WcR1. In addition, a range in which the light that passes through the boundary position between the pixel PR corresponding to the second viewpoint and the pixel PL corresponding to the first viewpoint that is adjacent to the pixel PR becomes parallel light by the convex lens is WeR1.

When the positional information relating to the viewpoint indicates the first value, the viewpoint is located at the position close to the center position of the parallel light formed by the light being emitted from the center portion of the pixel. For example, when the distance between the first viewpoint OPL and the parallax adjustment 3 is L1, the first viewpoint OPL is located at the position closer to the center of WeL1 than the center of WcL1. Thus, it is possible to view an image that is less affected by the adjacently arranged pixel associated with a different viewpoint.

When the positional information relating to the viewpoint indicates the second value, the viewpoint moves to the position close to the center position of the parallel light that is formed by the light being emitted from the boundary position with the adjacently arranged pixel associated with a different viewpoint. For example, when the distance between the first viewpoint OPL and the parallax adjustment 3 is L2, the first viewpoint OPL is located at the position closer to the center of WeL1 than the center of WcL1. In other words, the light from the boundary position with the adjacently arranged pixel associated with a different viewpoint becomes easily viewed. Thus, the pixel is affected by the adjacently arranged pixel associated with a different viewpoint, thereby generating crosstalk.

Thus, as illustrated in FIG. 23, when the positional information relating to the viewpoint indicates the second value, the display controller 4 controls the number of successive pixels corresponding to each of the viewpoints to be two.

A range in which the light that passes through the center position between the two pixels PL corresponding to the first viewpoint becomes parallel light by the convex lens is WcL2. In addition, a range in which the light that passes through the boundary position between the two pixels PL corresponding to the first viewpoint and the pixel PR corresponding to the second viewpoint that is adjacent to the pixel PL becomes parallel light by the convex lens is WeL2.

Meanwhile, a range in which the light that passes through the center position of the two pixels PR corresponding to the second viewpoint becomes parallel light by the convex lens is WcR2. In addition, a range in which the light that passes through the boundary position between the two pixels PR corresponding to the first viewpoint and the pixel PL corresponding to the second viewpoint adjacent to the pixel PR becomes parallel light by the convex lens is WeR2.

By controlling the number of successive pixels corresponding to each of the viewpoints to be two, it is possible to change the position of the parallel light that passes through the boundary position with the pixel associated with a different viewpoint. More specifically, when the distance between the first viewpoint OPL and the parallax adjustment 3 is L2, it is possible to arrange the first viewpoint OPL at the location closer to the center of WcL2 than the center of WeL2. Thus, it is possible to view an image that is less affected by the adjacently arranged pixel associated with a different viewpoint.

In FIG. 23, the display controller 4 changes the number of successive pixels corresponding to each of the viewpoints of the display unit 2, according to the change in the viewpoint position. However, the parallax controller 5 may change the width of the region to be controlled in the parallax adjustment 3. More specifically, as illustrated in FIG. 24, when the distance between the viewpoint OPL and the parallax adjustment 3 is L2, the width of the region to be controlled in the parallax adjustment 3 may be changed to W1$b$ that is different from W1$a$. W1$b$ is a value greater than W1$a$.

A range in which the light that passes through the center position of the two pixels PL corresponding to the first viewpoint becomes parallel light by the convex lens is WcL3. In addition, a range in which the light that passes through the boundary position between the two pixels PL corresponding to the first viewpoint and the pixel PR corresponding to the second viewpoint that is adjacent to the pixel PL becomes parallel light by the convex lens is WeL3.

Meanwhile, a range in which the light that passes through the center position of the two pixels PR corresponding to the second viewpoint becomes parallel light by the convex lens is WcR3. In addition, a range in which the light that passes through the boundary position between the two pixels PR corresponding to the first viewpoint and the pixel PL corresponding to the second viewpoint that is adjacent to the pixel PR becomes parallel light by the convex lens is WeR3.

In this manner, by increasing the width of the region to be controlled, it is possible to increase the range of the parallel light from the center portion of the pixels corresponding to the same viewpoint, thereby suppressing the influence of crosstalk. More specifically, because the width WcL3 of the parallel light that passes through the center position of the two pixels PL corresponding to the same viewpoint OPL becomes larger than WcL2, the light that passes through the center position of the pixels PL can be viewed at the viewpoint OPL. Consequently, it is possible to view an image that is less affected by light from the pixel PR associated with the different viewpoint OPR.

In other words, the display device 1 includes: the display unit 2 that has pixels arranged in a matrix and that displays an image corresponding to the viewpoints; the parallax adjustment 3 arranged at the position facing the display unit 2 and made of the regions to be controlled that distribute light from the pixel corresponding to each of the viewpoints into each viewpoint; the parallax controller 5 that changes the width of the region to be controlled based on the positional information relating to the viewpoint; and the display controller 4 that changes the number of successive pixels displaying an image corresponding to each of the viewpoints, based on the positional information relating to the viewpoint. Consequently, it is possible to provide the display device that can display an optimal image that is less affected by the adjacently arranged pixel corresponding to a different viewpoint, with respect to the front-to-rear movement of the observer corresponding to the viewpoint relative to the display device.

In other words, the display device 1 includes: the display unit 2 that includes pixels arranged in a matrix and that displays an image corresponding to the viewpoints; the parallax adjustment 3 that is arranged at the position facing the display unit 2, that includes the regions to be controlled corresponding to the third electrodes 33, and that distributes the light of the pixel corresponding to each of the viewpoints into each viewpoint according to the electric charge supplied to the third electrodes 33 forming each of the regions to be controlled; the parallax controller 5 that changes the number of third electrodes 33 included in the region to be controlled, based on the positional information relating to the viewpoint; and the display controller 4 that changes the number of pixels displaying the same image corresponding to each of the viewpoints, based on the positional information relating to the viewpoint. Consequently, it is possible to provide the display device that can display an optimal image that is less affected by the adjacently arranged pixel corresponding to a different viewpoint, with respect to the front-to-rear movement of the observer corresponding to the viewpoint relative to the display device.

In the present embodiment, in the parallax adjustment 3, the transmissive regions 301 and the non-transmissive regions 302 are alternately arranged, and the light from the pixels that are different for each of the viewpoints is transmitted. However, all the regions in the parallax adjustment 3 may be the transmissive regions. For example, the parallax adjustment 3 may include a two-dimensional (2D) display mode, a three-dimensional (3D) display mode, and a multi-viewpoint mode in a switchable manner. In the 2D display mode, all the regions in the parallax adjustment 3 are the transmissive regions 301. In the 3D display mode, images are displayed by pixels corresponding to the respective viewpoints for the right eye and the left eye, as in the present embodiment. In the multi-viewpoint mode, the first viewpoint and the second viewpoint are viewpoints corresponding to different observers, and images are displayed by different pixels for each of the observers. Furthermore, in the present embodiment, the parallax controller 5 changes the width of the transmissive regions 301 that are sequentially arranged, according to the front-to-rear movement (Z axis direction) of the viewpoint relative to the display unit 2. However, the present invention is not limited thereto, and the parallax controller 5 may change the position of the transmissive region 301 according to the moving direction, when the viewpoint moves in the left-right direction (X direction or Y direction) relative to the display unit 2.

In the present embodiment, the positional information relating to the viewpoint is used as the external information. However, the present invention is not limited thereto. For example, the external information may also be a selection signal selected by a user of the display device. More specifically, it may be configured such that a specific signal, the number of successive pixels corresponding to each of the viewpoints and the number of the regions to be controlled in the parallax adjustment 3 are stored in association with one another, and the display controller 4 and the parallax controller 5 may change the number of successive pixels corresponding to each of the viewpoints and the number and the position of the regions to be controlled, based on the signal selected by the user of the display device.

For example, the selection signal selected by the user is not limited to the signal obtained by input of a specific numeric value or the like. For example, when the display device according to the present invention is mounted in a vehicle and the like, a signal according to an adjusted position of a seat may be used as the selection signal.

The preferred embodiment of the present invention has been described, but the embodiment is not intended to limit the present invention. The disclosed embodiment is merely an example, and various modifications may be made within the scope of the present invention. Appropriate modifications made within the scope of the present invention naturally belongs to the technical scope of the present invention.

The present invention at least includes the following aspects.

(1) A display device, comprising:
a display unit that includes a plurality of pixels arranged in a matrix and that is configured to display images corresponding to a plurality of viewpoints;
a parallax adjustment that is placed at a position facing the display unit, and in which a plurality of transmissive regions for transmitting light and a plurality of non-transmissive regions for limiting transmittance of light are provided in a switchable manner;
a parallax controller that is configured to change a position of the transmissive regions and the non-transmissive regions, based on external information; and
a display controller that is configured to change a number of successive pixels displaying an image corresponding to each of the viewpoints, based on external information.

(2) The display device according to (1), wherein the display controller is configured to, when a distance between the display unit and the viewpoint is a second distance that is shorter than a first distance, increase the number of successive pixels displaying an image corresponding to each of the viewpoints at the second distance, than the number of pixels displaying an image corresponding to each of the viewpoints at the first distance.

(3) The display device according to (1) or (2), wherein the parallax controller is configured to, when a distance between the display unit and the viewpoint is a second distance that is shorter than a first distance, increase a width of the transmissive regions that transmit light corresponding to each of the viewpoints at the second distance than a width of the transmissive regions that transmit light corresponding to each of the viewpoints at the first distance.

(4) The display device according to any one of (1) to (3), wherein a same pixel signal is applied to an adjacently arranged pixel.

(5) The display device according to any one of (1) to (4), wherein
the pixels are associated with at least two or more colors, and
the pixels associated with each of the viewpoints are associated with a same color.

(6) The display device according to any one of (1) to (4), wherein
the pixels are associated with at least two or more colors, and
when a number of the viewpoints is k; the number of successive pixels displaying an image corresponding to each of the viewpoints is a (a≥1) in a case where the external information indicates a first value; and the number of successive pixels displaying an image corresponding to each of the viewpoints is b (b>a) in a case where the external information indicates a second value; a same pixel signal is supplied to S/k pixels, for the pixels successively arranged, a number of which corresponds to a least common multiple S of ka and kb.

(7) The display device according to any one of (1) to (6), further comprising:
a plurality of switching elements, a number of which at least corresponds to a number of the viewpoints for each of the pixels, wherein
the display controller is configured to switch the switching elements.

(8) The display device according to (7), wherein
in the display unit, a gate line corresponding to each of the viewpoints is arranged in a first direction, and a signal line corresponding to each of the viewpoints is arranged in a second direction intersecting with the first direction;
each of the switching elements is a transistor, and
one of a source or a drain of the transistor is coupled to the signal line, and a gate of the transistor is coupled to the gate line.

(9) The display device according to (8), wherein
the display controller includes a gate selection circuit that is coupled to the gate line corresponding to each of the viewpoints, and
the display controller is configured to apply a gate signal to the selected gate line, according to a selection signal applied to the gate selection circuit.

(10) The display device according to (9), wherein
the gate selection circuit includes a latching circuit, and
the latching circuit holds the selection signal.

(11) The display device according to (8), wherein the transmissive regions and the non-transmissive regions of the parallax adjustment both extend in the second direction.

(12) The display device according to (8), wherein the parallax adjustment includes a plurality of electrodes that are arranged in the first direction and that extend in the second direction.

(13) The display device according to any one of (1) to (12), wherein
the parallax adjustment includes:
a first substrate and a second substrate with a liquid crystal layer interposed therebetween;
a plurality of first electrodes in a stripe shape that are provided on a surface of the first substrate facing the second substrate; and
a second electrode that is provided on the second substrate and that faces the first electrodes,
each of the transmissive regions and the non-transmissive regions has one first electrode, or a plurality of first electrodes that are sequentially arranged, and
the transmissive regions and the non-transmissive regions are switched by changing an orientation of a liquid crystal molecule of the liquid crystal layer by an electric field applied between the first electrodes and the second electrode.

(14) The display device according to any one of (1) to (13), wherein
the parallax controller includes a drive signal supply circuit and a drive signal holding circuit, and
the drive signal supply circuit is configured to receive a drive signal based on the external information, and the drive signal holding circuit is configured to sequentially store therein a signal from the drive signal supply circuit and output the signal to the parallax adjustment.

(15) The display device according to any one of (1) to (14), wherein a width of a part of the transmissive regions among the transmissive regions or a width of a part of the non-transmissive regions among the non-transmissive regions is changed, based on the external information.

(16) The display device according to (15), wherein a number of transmissive regions or the non-transmissive regions, the width of each of which is to be changed among the transmissive regions or the non-transmissive regions is determined, based on the external information.

(17) The display device according to (15) or (16), wherein the transmissive regions or the non-transmissive regions, the width of each of which is to be changed among the transmissive regions or the non-transmissive regions, are uniformly arranged, based on the external information.

(18) The display device according to any one of (1) to (17), wherein the external information includes information on an angle at a position of the viewpoint, relative to a direction perpendicular to a display surface of the display unit.

(19) The display device according to any one of (1) to (17), wherein
the display unit includes a display panel in which the pixels are arranged in a matrix, and an illuminator that is configured to emit light to the display panel, and
the parallax adjustment is arranged between the illuminator and the display panel.

(20) A method for controlling a display device including:
a display unit that includes a plurality of pixels arranged in a matrix and that is configured to display images corresponding to a plurality of viewpoints; and
a parallax adjustment that is placed at a position facing the display unit, and in which a plurality of transmissive regions for transmitting light and a plurality of non-transmissive regions for limiting transmittance of light are provided in a switchable manner, the method comprising:
changing positions of the transmissive regions and the non-transmissive regions; and
changing a number of successive pixels displaying an image corresponding to each of the viewpoints, based on external information.

(21) An electronic apparatus, comprising:
a display unit that includes a plurality of pixels arranged in a matrix and that is configured to display images corresponding to a plurality of viewpoints;
a parallax adjustment that is placed at a position facing the display unit, and in which a plurality of transmissive regions for transmitting light and a plurality of non-transmissive regions for limiting transmittance of light are provided in a switchable manner;
a parallax controller that is configured to change positions of the transmissive regions and the non-transmissive regions, based on external information;
a display controller that is configured to change a number of successive pixels displaying an image corresponding to each of the viewpoints, based on external information; and
a positional information acquisition circuit that is configured to acquire positional information relating to the viewpoint.

(22) A display device, comprising:
a display unit that includes a plurality of pixels arranged in a matrix and that is configured to display images corresponding to at least a first viewpoint and a second viewpoint; and
a parallax adjustment that is placed at a position facing the display unit, and in which a plurality of transmissive regions for transmitting light and a plurality of non-transmissive regions for limiting transmittance of light are provided in a switchable manner, wherein
when a distance between an observer and the display unit is a first distance,
at least a part of the transmissive regions and the non-transmissive regions are alternately arranged at a first interval in the parallax adjustment, and
the display unit is configured to display an image corresponding to each of the viewpoints with p (p≥1) successive pixels; and
when the distance between the observer and the display unit is a second distance that is shorter than the first distance,
at least a part of the transmissive regions and the non-transmissive regions are alternately arranged at a second interval that is larger than the first interval in the parallax adjustment, and
the display unit is configured to display an image corresponding to each of the viewpoints with q (q>p) successive pixels.

(23) A display device, comprising:
a display unit that includes a plurality of pixels arranged in a matrix and that is configured to display images corresponding to a plurality of viewpoints;
a parallax adjustment that is placed at a position facing the display unit, that includes a plurality of regions to be controlled each having a plurality of electrodes, and that is configured to distribute light of each of the pixels into each of the viewpoints, according to electric charges to be applied to the electrodes forming each of the regions to be controlled;
a parallax controller that is configured to change a number or a position of the electrodes forming each of the regions to be controlled, based on external information; and
a display controller that is configured to change a number of successive pixels displaying an image corresponding to each of the viewpoints, based on external information.

What is claimed is:
1. A display device, comprising:
a display unit that includes a plurality of pixels arranged in a matrix and that is configured to display images corresponding to a plurality of viewpoints including a first viewpoint;
a parallax adjustment that is placed at a position facing the display unit, and in which a plurality of transmissive regions for transmitting light and a plurality of non-transmissive regions for limiting transmittance of light are provided in a switchable manner, the transmissive regions including a first transmissive region and a second transmissive region, and the non-transmissive regions including a first non-transmissive region adjacent to the first transmissive region and a second non-transmissive region adjacent to the second transmissive region;
a parallax controller that is configured to set:
in a first mode, a combined width of the first transmissive region and the first non-transmissive region to be same as a combined width of the second transmissive region and the second non-transmissive region; and
in a second mode, the combined width of the first transmissive region and the first non-transmissive region to be different from the combined width of the second transmissive region and the second non-transmissive region; and a display controller that is configured to set:
in the first mode, the number of successive pixels displaying an image corresponding to the first viewpoint to be a first value; and
in the second mode, the number of successive pixels displaying an image corresponding to the first viewpoint to be a second value different from the first value, wherein
the pixels include a first pixel,
the viewpoints further include a second viewpoint,
the display unit further includes:
a plurality of signal lines including a first signal line supplied with a first signal corresponding to the first viewpoint and a second signal line supplied with a second signal corresponding to the second viewpoint; and
a plurality of switches including a first switch coupled to the first signal line and a second switch coupled to the second signal line,
the first switch and the second switch are arranged in the first pixel, and
the display controller is configured to switch between the first signal and the second signal to be supplied to the first pixel using the first switch and the second switch.

2. The display device according to claim 1, wherein the display controller is configured to set:
in the first mode, when a distance between the display unit and the viewpoint is a first distance, the number of successive pixels displaying the image corresponding to the first viewpoint to be the first value; and
in the second mode, when the distance between the display unit and the viewpoint is a second distance that is shorter than the first distance, the number of successive pixels displaying an image corresponding to the first viewpoint to be the second value, wherein the first value is smaller than the second value.

3. The display device according to claim 1, wherein the parallax controller is configured to set:
in the first mode, when a distance between the display unit and the viewpoint is a first distance, a width of the first transmissive region to be a first width, and
in the second mode, when the distance between the display unit and the viewpoint is a second distance that is shorter than the first distance, the width of the first transmissive region to be a second width, wherein the first width is smaller than the second width.

4. The display device according to claim 1, wherein
the plurality of pixels are associated with at least two or more colors,
the display unit includes a plurality of sets of the successive pixels including a first set of the successive pixels associated with the first viewpoint and a second set of the successive pixels associated with the second viewpoint,
the first set of the successive pixels is adjacent to the second set of the successive pixels, and
the first set of the successive pixels and the second set of the successive pixels are associated with a same color in the first mode and the second mode.

5. The display device according to claim 1, wherein
the plurality of pixels are associated with at least two or more colors, and
when
the number of the viewpoints is k;
the number of successive pixels displaying an image corresponding to each of the viewpoints is a (a≥1) in the first mode; and
the number of successive pixels displaying an image corresponding to each of the viewpoints is b (b>a) in the second mode,
a same pixel signal is supplied to S/k pixels, for the pixels successively arranged, the number of which corresponds to a least common multiple S of ka and kb.

6. The display device according to claim 1, wherein
the display unit further includes a plurality of gate lines that includes a first gate line corresponding to the first viewpoint and a second gate line corresponding to the second viewpoint, the gate lines being arranged in a first direction,
the first signal line and the second signal line are arranged in a second direction intersecting with the first direction,
each of the first switch and the second switch is a transistor,
one of a source or a drain of the first switch is coupled to the first signal line,
a gate of the first switch is coupled to the first gate line,
one of a source or a drain of the second switch is coupled to the second signal line, and
a gate of the second switch is coupled to the second gate line.

7. The display device according to claim 6, wherein
the display controller includes a gate selection circuit that is coupled to the first gate line and the second gate line, and
the display controller is configured to apply a gate signal to a selected gate line which is selected from the first gate line and the second line, according to a selection signal applied to the gate selection circuit.

8. The display device according to claim 7, wherein
the gate selection circuit includes a latching circuit, and the latching circuit holds the selection signal.

9. The display device according to claim 1, wherein the parallax adjustment further includes a plurality of electrodes that are arranged in a first direction and that extend in a second direction.

10. The display device according to claim 1, wherein
the transmissive regions include a first transmissive region type and a second transmissive region type,
the non-transmissive regions include a first non-transmissive region type and a second non-transmissive region type,
a width of the first transmissive region type in the first mode is different from a width of the first transmissive region type in the second mode, or
a width of the first non-transmissive region type in the first mode is different from a width of the first non-transmissive region type in the second mode.

11. The display device according to claim 10, wherein the number of the transmissive regions of the first transmissive region type or the number of the non-transmissive regions of the first non-transmissive region type is determined based on external information.

12. The display device according to claim 10, wherein, in the second mode, the transmissive regions of the first transmissive region type are uniformly arranged or the non-transmissive regions of the first non-transmissive region type are uniformly arranged.

13. The display device according to claim 1, wherein the first mode and the second mode are switched based on external information that includes information on an angle at a position of the viewpoint, relative to a direction perpendicular to a display surface of the display unit.

14. The display device according to claim 1, wherein
the display unit includes a display panel in which the pixels are arranged in a matrix, and an illuminator that is configured to emit light to the display panel, and
the parallax adjustment is arranged between the illuminator and the display panel.

15. An electronic apparatus, comprising the display device according to claim 1.

16. A method for controlling a display device including:
a display unit that includes a plurality of pixels arranged in a matrix and that is configured to display images corresponding to a plurality of viewpoints including a first viewpoint; and
a parallax adjustment that is placed at a position facing the display unit, and in which a plurality of transmissive regions for transmitting light and a plurality of non-transmissive regions for limiting transmittance of light are provided in a switchable manner, the transmissive regions including a first transmissive region and a second transmissive region, and the non-transmissive regions including a first non-transmissive region adjacent to the first transmissive region and a second non-transmissive region adjacent to the second transmissive region,
wherein
the pixels include a first pixel,
the viewpoints further include a second viewpoint,
the display unit further includes:
a plurality of signal lines including a first signal line supplied with a first signal corresponding to the first viewpoint and a second signal line supplied with a second signal corresponding to the second viewpoint; and
a plurality of switches including a first switch coupled to the first signal line and a second switch coupled to the second signal line,
the first switch and the second switch are arranged in the first pixel, and
the display controller is configured to switch between the first signal and the second signal to be supplied to the first pixel using the first switch and the second switch,
the method comprising:
setting, in a first mode, a combined width of the first transmissive region and the first non-transmissive region to be same as a combined width of the second transmissive region and the second non-transmissive region;
setting, in a second mode, the combined width of the first transmissive region and the first non-transmissive region to be different from the combined width of the second transmissive region and the second non-transmissive region;
setting, in the first mode, the number of successive pixels displaying an image corresponding to the first viewpoint to be a first value; and setting, in the second mode, the number of successive pixels displaying an image corresponding to the first viewpoint to be a second value different from the first value.

17. A display device, comprising:
a display unit that includes a plurality of pixels arranged in a matrix and that is configured to display images corresponding to at least a first viewpoint and a second viewpoint; and
a parallax adjustment that is placed at a position facing the display unit, and in which a plurality of transmissive regions for transmitting light and a plurality of non-transmissive regions for limiting transmittance of light are provided in a switchable manner, the transmissive regions including a first transmissive region, a second transmissive region, and a third transmissive region; the non-transmissive regions including a first non-transmissive region, a second non-transmissive region, and a third non-transmissive region; and the first transmissive region, the first non-transmissive region, the second transmissive region, the second non-transmissive region, the third transmissive region and the third non-transmissive region are arranged continuously,
wherein:
in a first mode,
the parallax adjustment sets a combined width from a first boundary between the first transmissive region and the first non-transmissive region to a second boundary between the second transmissive region and the second non-transmissive region to be same as a combined width from the second boundary to a third boundary between the third transmissive region and the third non-transmissive region, and
a display controller sets the number of successive pixels displaying an image corresponding to the first viewpoint to be a first value; and
in a second mode,
the parallax adjustment sets the combined width from the first boundary to the second boundary to be different from the combined width from the second boundary to the third boundary, and
the display controller sets the number of successive pixels displaying an image corresponding to the first viewpoint to be a second value different from the first value,
the display unit further includes:
a plurality of signal lines including a first signal line supplied with a first signal corresponding to the first viewpoint and a second signal line supplied with a second signal corresponding to the second viewpoint; and
a plurality of switches including a first switch coupled to the first signal line and a second switch coupled to the second signal line,
the first switch and the second switch are arranged in a first pixel, and
the display controller is configured to switch between the first signal and the second signal to be supplied to the first pixel using the first switch and the second switch.

* * * * *